United States Patent
Nikaku et al.

(10) Patent No.: US 10,674,027 B2
(45) Date of Patent: Jun. 2, 2020

(54) POSITION DETECTING DEVICE, IMAGE FORMING APPARATUS, AND METHOD

(71) Applicants: Daisuke Nikaku, Kanagawa (JP); Masamoto Nakazawa, Kanagawa (JP); Ryohma Ikemoto, Kanagawa (JP)

(72) Inventors: Daisuke Nikaku, Kanagawa (JP); Masamoto Nakazawa, Kanagawa (JP); Ryohma Ikemoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/255,870

(22) Filed: Jan. 24, 2019

(65) Prior Publication Data

US 2019/0238687 A1  Aug. 1, 2019

(30) Foreign Application Priority Data

Jan. 26, 2018  (JP) ................................ 2018-012074

(51) Int. Cl.
*H04N 1/00* (2006.01)

(52) U.S. Cl.
CPC ........ *H04N 1/0075* (2013.01); *H04N 1/00702* (2013.01); *H04N 1/00724* (2013.01); *H04N 1/00734* (2013.01); *H04N 1/00779* (2013.01); *H04N 1/00785* (2013.01)

(58) Field of Classification Search
CPC ............. H04N 1/0075; H04N 1/00734; H04N 1/00724; H04N 1/00785; H04N 1/00702; H04N 1/00779
USPC ........................................................ 358/448
See application file for complete search history.

(56) References Cited

U.S. PATENT DOCUMENTS

| | | | |
|---|---|---|---|
| 2002/0012127 A1* | 1/2002 | Soeda | H04N 1/4076 358/1.9 |
| 2007/0188638 A1 | 8/2007 | Nakazawa et al. | |
| 2008/0252787 A1 | 10/2008 | Nakazawa et al. | |
| 2010/0027061 A1 | 2/2010 | Nakazawa | |
| 2010/0171998 A1 | 7/2010 | Nakazawa | |
| 2011/0026083 A1 | 2/2011 | Nakazawa | |
| 2011/0026085 A1 | 2/2011 | Tsukahara et al. | |
| 2011/0051201 A1 | 3/2011 | Hashimoto et al. | |
| 2011/0063488 A1 | 3/2011 | Nakazawa | |
| 2012/0008173 A1 | 1/2012 | Konno et al. | |
| 2012/0092732 A1 | 4/2012 | Nakazawa | |

(Continued)

FOREIGN PATENT DOCUMENTS

| | | |
|---|---|---|
| JP | 2007-119135 | 5/2007 |
| JP | 2008-003286 | 1/2008 |

OTHER PUBLICATIONS

U.S. Appl. No. 16/135,578, filed Sep. 19, 2018 Daisuke Nikaku, et al.

(Continued)

*Primary Examiner* — Saeid Ebrahimi Dehkordy
(74) *Attorney, Agent, or Firm* — Oblon, McClelland, Maier & Neustadt, L.L.P.

(57) ABSTRACT

A position detecting device includes an image sensor and circuitry. The image sensor is configured to read reflected light of light emitted from a light source onto a medium to be read. The circuitry is configured to perform black correction processing on an output signal of the image sensor using black correction data of the image sensor and detect a position of the medium from the output signal after the black correction processing.

20 Claims, 31 Drawing Sheets

(56) References Cited

U.S. PATENT DOCUMENTS

| | | |
|---|---|---|
| 2012/0224205 A1 | 9/2012 | Nakazawa |
| 2013/0044338 A1 | 2/2013 | Nikaku |
| 2013/0063792 A1 | 3/2013 | Nakazawa |
| 2014/0029065 A1 | 1/2014 | Nakazawa |
| 2014/0078532 A1 | 3/2014 | Nikaku |
| 2014/0204427 A1 | 7/2014 | Nakazawa |
| 2014/0204432 A1 | 7/2014 | Hashimoto et al. |
| 2014/0211273 A1 | 7/2014 | Konno et al. |
| 2014/0368893 A1 | 12/2014 | Nakazawa et al. |
| 2015/0098117 A1 | 4/2015 | Marumoto et al. |
| 2015/0116794 A1 | 4/2015 | Nakazawa |
| 2015/0163378 A1 | 6/2015 | Konno et al. |
| 2015/0222790 A1 | 8/2015 | Asaba et al. |
| 2015/0304517 A1 | 10/2015 | Nakazawa et al. |
| 2016/0003673 A1 | 1/2016 | Hashimoto et al. |
| 2016/0006961 A1 | 1/2016 | Asaba et al. |
| 2016/0088179 A1 | 3/2016 | Nakazawa et al. |
| 2016/0112660 A1 | 4/2016 | Nakazawa et al. |
| 2016/0173719 A1 | 6/2016 | Hashimoto et al. |
| 2016/0268330 A1 | 9/2016 | Nakazawa et al. |
| 2016/0295138 A1 | 10/2016 | Asaba et al. |
| 2016/0373604 A1 | 12/2016 | Hashimoto et al. |
| 2017/0019567 A1 | 1/2017 | Konno et al. |
| 2017/0163836 A1 | 6/2017 | Nakazawa |
| 2017/0170225 A1 | 6/2017 | Asaba et al. |
| 2017/0201700 A1 | 7/2017 | Hashimoto et al. |
| 2017/0214827 A1* | 7/2017 | Sasaki ................ H04N 1/00045 |
| 2017/0295298 A1 | 10/2017 | Ozaki et al. |
| 2017/0302821 A1 | 10/2017 | Sasa et al. |
| 2017/0324883 A1 | 11/2017 | Konno et al. |
| 2018/0146150 A1 | 5/2018 | Shirado et al. |
| 2018/0175096 A1 | 6/2018 | Inoue et al. |
| 2018/0213124 A1 | 7/2018 | Yokohama et al. |
| 2018/0261642 A1 | 9/2018 | Asaba et al. |

OTHER PUBLICATIONS

U.S. Appl. No. 16/155,781, filed Oct. 9, 2018 Tatsuya Ishii, et al.
U.S. Appl. No. 16/155,802, filed Oct. 9, 2018 Tatsuya Ishii, et al.

* cited by examiner

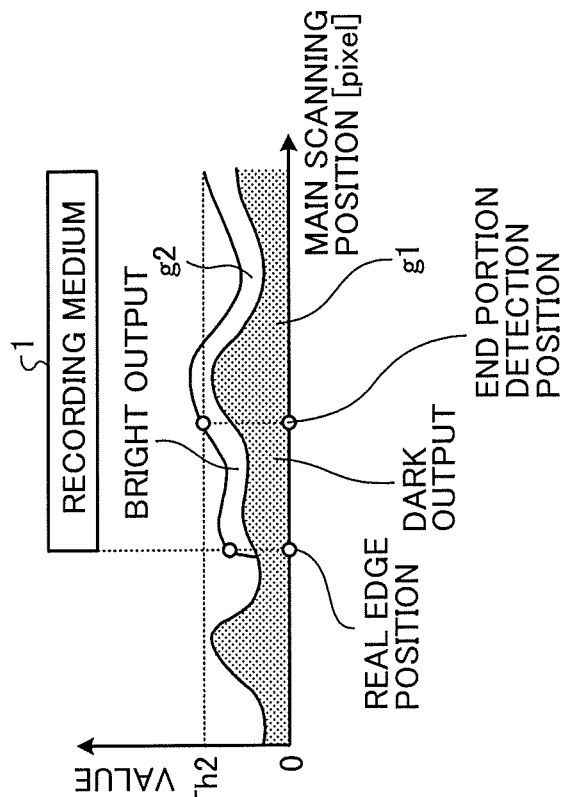
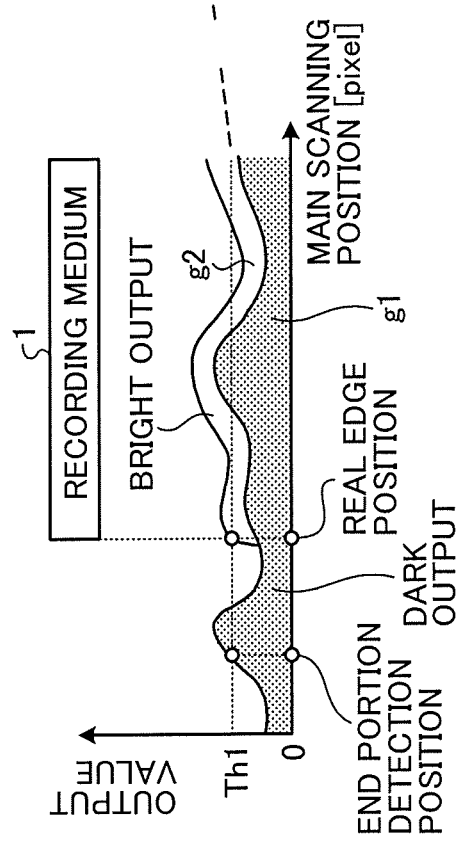

| MEDIUM TYPE | BLACK SHADING CORRECTION | STORAGE TIME (LINE SYNCHRONIZATION SIGNAL CYCLE) | GAIN | NOTE |
|---|---|---|---|---|
| HIGH DENSITY | TO BE EXECUTED (ON) | STORAGE TIME 1 (600μsec) | GAIN 1 (DOUBLED) | BLACK PAPER, OHP SHEET, ETC. |
| LOW DENSITY | NOT TO BE EXECUTED (OFF) | STORAGE TIME 2 (200μsec) | GAIN 2 (SAME MAGNIFICATION) | WHITE PAPER, ETC. |

FIG. 11

| MEDIUM TYPE | BLACK SHADING CORRECTION | STORAGE TIME (LINE SYNCHRONIZATION SIGNAL CYCLE) | GAIN | NOTE |
|---|---|---|---|---|
| HIGH DENSITY | TO BE EXECUTED (ON) | STORAGE TIME 1 (600μsec) | GAIN 1 (DOUBLED) | BLACK PAPER, OHP SHEET, ETC. |
| LOW DENSITY | TO BE EXECUTED (ON) | STORAGE TIME 2 (200μsec) | GAIN 2 (SAME MAGNIFICATION) | WHITE PAPER, ETC. |

FIG. 14

| MEDIUM TYPE | BLACK SHADING CORRECTION | BLACK CORRECTION DATA GENERATION TIME (NUMBER OF LINES) | STORAGE TIME (LINE SYNCHRONIZATION SIGNAL CYCLE) | GAIN | NOTE |
|---|---|---|---|---|---|
| HIGH DENSITY | TO BE EXECUTED (ON) | GENERATION TIME 1 (20 LINES) | STORAGE TIME 1 (600μsec) | GAIN 1 (DOUBLED) | BLACK PAPER, OHP SHEET, ETC. |
| LOW DENSITY | TO BE EXECUTED (ON) | GENERATION TIME 2 (60 LINES) | STORAGE TIME 2 (200μsec) | GAIN 2 (SAME MAGNIFICATION) | WHITE PAPER, ETC. |

FIG. 16

| MEDIUM TYPE | BLACK SHADING CORRECTION | STORAGE TIME (LINE SYNCHRONIZATION SIGNAL CYCLE) | GAIN | NOTE |
|---|---|---|---|---|
| HIGH DENSITY | TO BE EXECUTED (ON) | STORAGE TIME 1 (600μsec) | GAIN 1 (DOUBLED) | BLACK PAPER, OHP SHEET, ETC. |
| MODERATE DENSITY | TO BE EXECUTED (ON) | STORAGE TIME 1 (600μsec) | GAIN 2 (SAME MAGNIFICATION) | COLOR PAPER, ETC. |
| LOW DENSITY | TO BE EXECUTED (ON) | STORAGE TIME 2 (200μsec) | GAIN 2 (SAME MAGNIFICATION) | WHITE PAPER, ETC. |

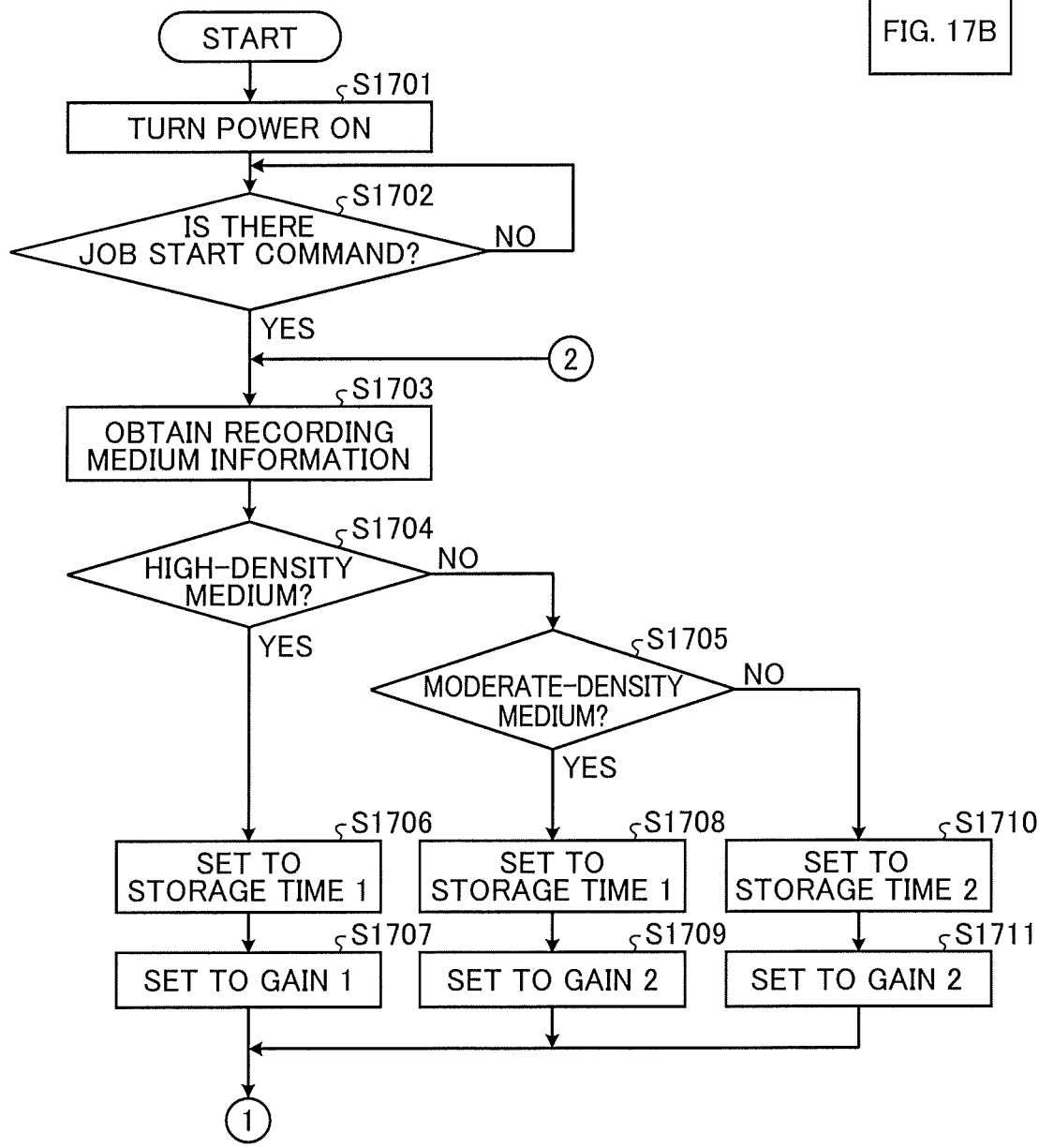

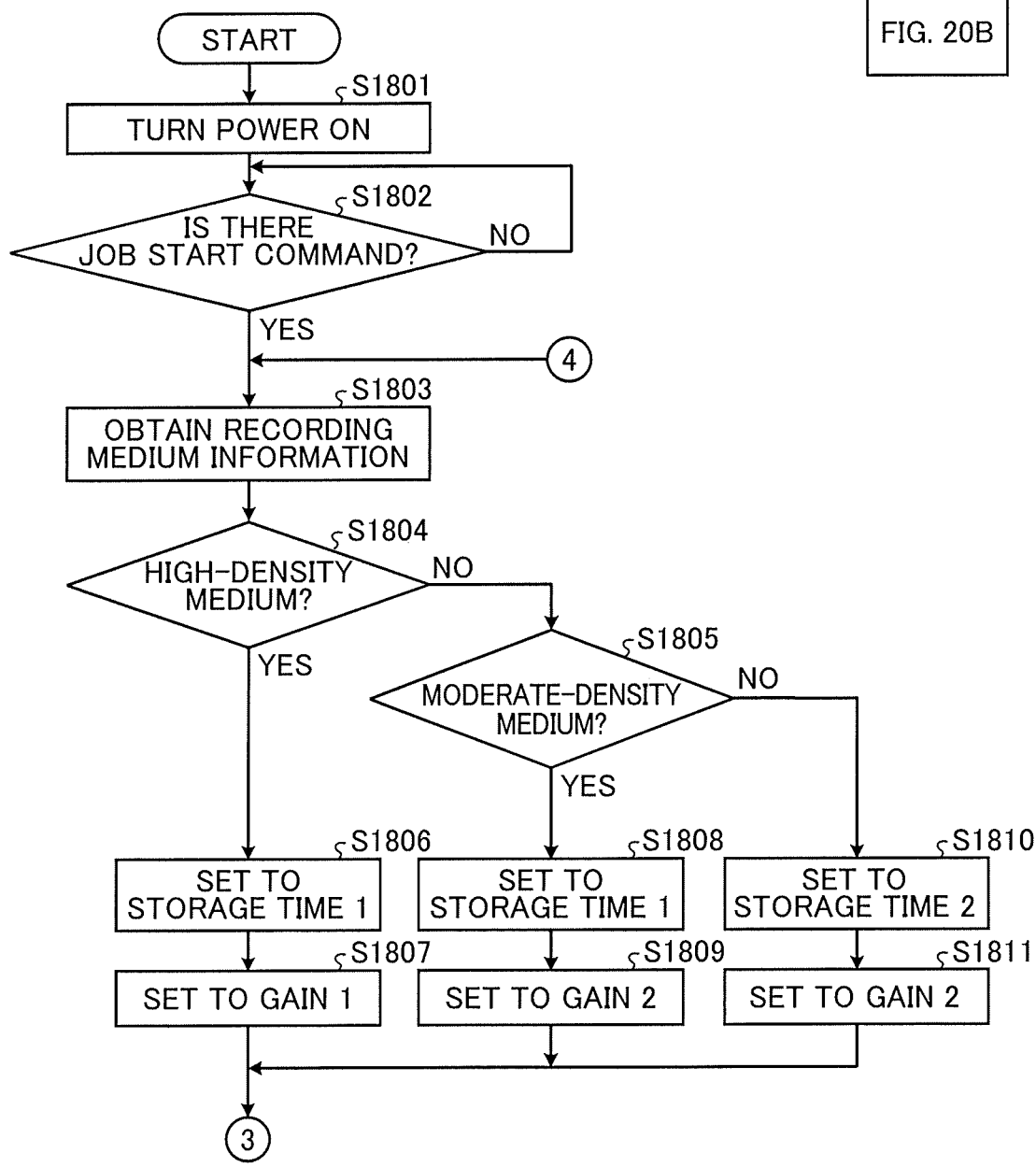

FIG. 21

| MEDIUM TYPE | BLACK SHADING CORRECTION | STORAGE TIME (LINE SYNCHRONIZATION SIGNAL CYCLE) | GAIN | CORRECTION COEFFICIENT | NOTE |
|---|---|---|---|---|---|
| HIGH DENSITY | TO BE EXECUTED (ON) | STORAGE TIME 1 (600μsec) | GAIN 1 (DOUBLED) | CORRECTION COEFFICIENT 1 −511 | BLACK PAPER, OHP SHEET, ETC. |
| MODERATE DENSITY | TO BE EXECUTED (ON) | STORAGE TIME 1 (600μsec) | GAIN 2 (SAME MAGNIFICATION) | CORRECTION COEFFICIENT 2 −255 | COLOR PAPER, ETC. |
| LOW DENSITY | TO BE EXECUTED (ON) | STORAGE TIME 2 (200μsec) | GAIN 2 (SAME MAGNIFICATION) | CORRECTION COEFFICIENT 2 −255 | WHITE PAPER, ETC. | d1

FIG. 22

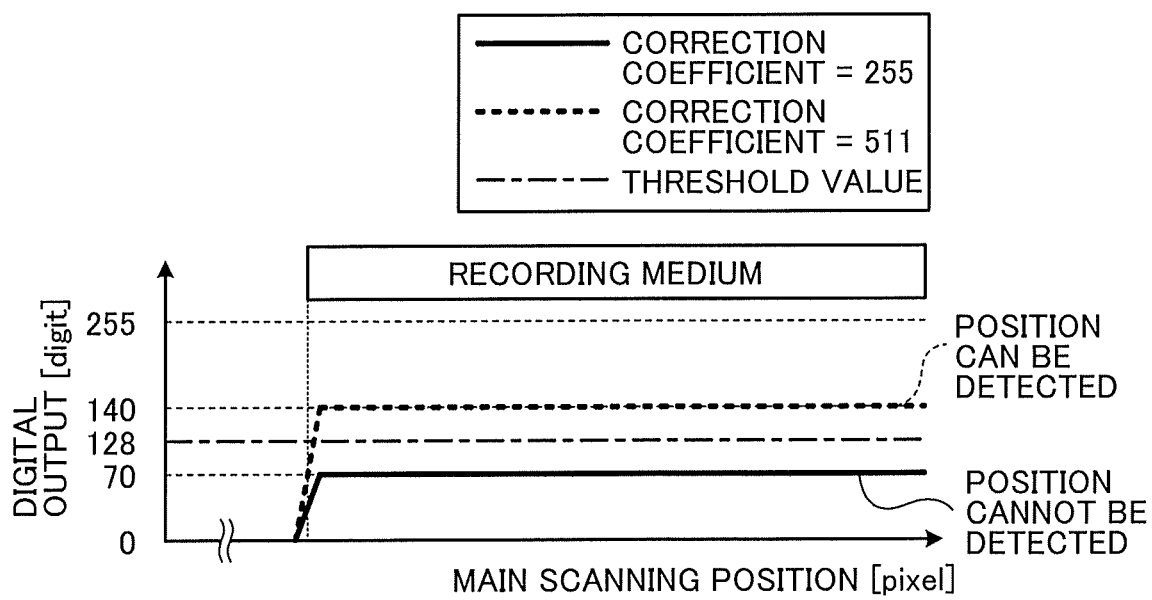

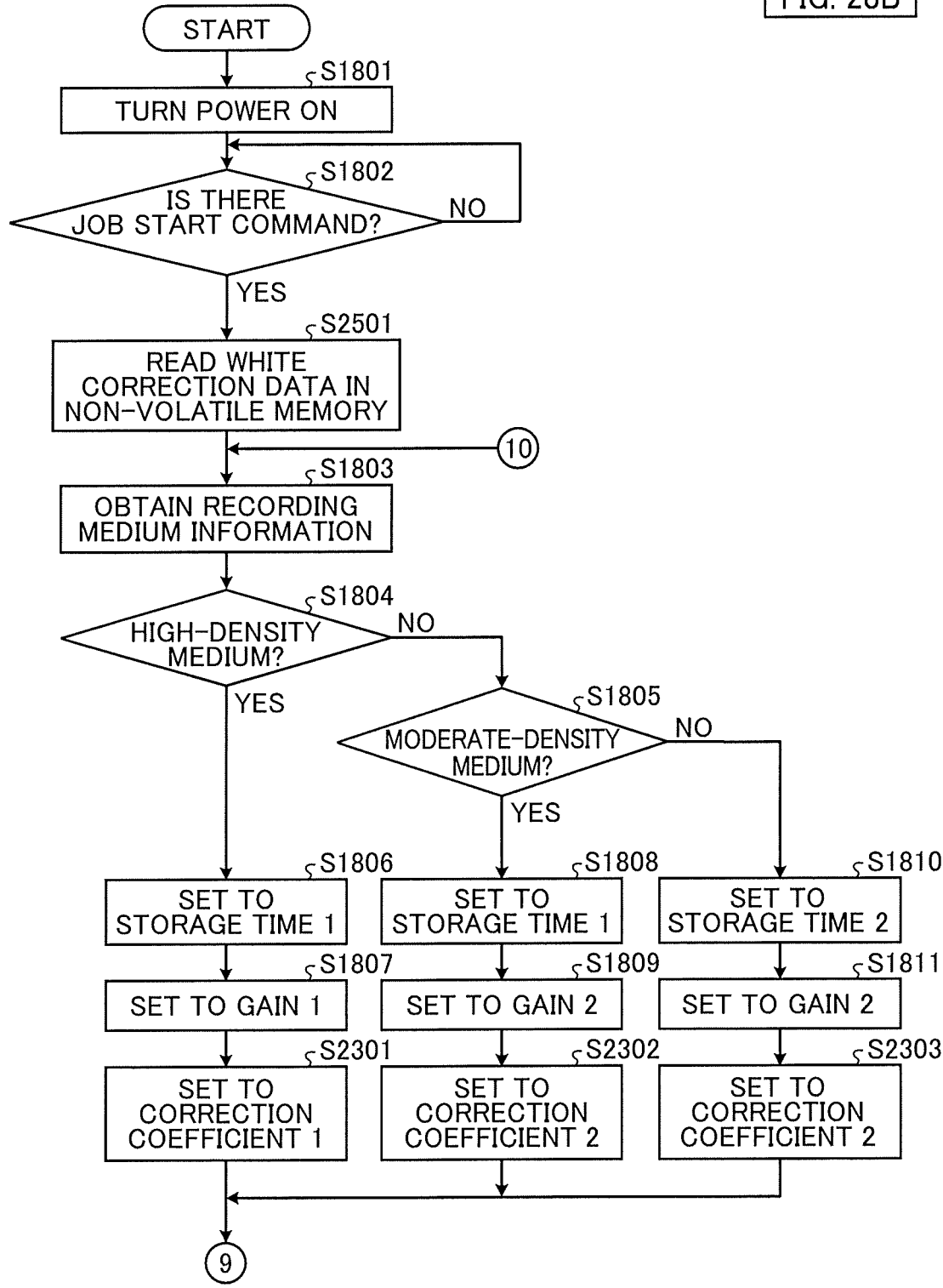

POSITION DETECTING DEVICE, IMAGE FORMING APPARATUS, AND METHOD

CROSS-REFERENCE TO RELATED APPLICATIONS

This patent application is based on and claims priority pursuant to 35 U.S.C. § 119(a) to Japanese Patent Application No. 2018-012074, filed on Jan. 26, 2018, in the Japan Patent Office, the entire disclosure of which is hereby incorporated by reference herein.

BACKGROUND

Technical Field

The present invention relates to a position detecting device, an image forming apparatus, and a method.

Discussion of the Background Art

There has been known a technique of detecting, in an electrographic image forming apparatus, an end portion of a recording medium in a main-scanning direction with reference to a threshold value using an optical sensor disposed in a conveying path of the recording medium, and calculating a deviation amount and a skew amount of a main scanning resist from the position of the detected end portion.

SUMMARY

In an aspect of the present disclosure, there is provided a position detecting device that includes an image sensor and circuitry. The image sensor is configured to read reflected light of light emitted from a light source onto a medium to be read. The circuitry is configured to perform black correction processing on an output signal of the image sensor using black correction data of the image sensor and detect a position of the medium from the output signal after the black correction processing.

In another aspect of the present disclosure, there is provided a method of detecting positional deviation of a medium. The method includes reading reflected light of light emitted from a light source onto a medium to be read using an image sensor, performing black correction processing on an output signal of the image sensor using black correction data of the image sensor, and detecting a position of the medium from the output signal after the black correction processing.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 3A and 3B are explanatory graphs illustrating that an edge position is erroneously detected when the recording medium having high density (low reflectance) is read;

FIG. 11 is a table illustrating a setting of recording medium information according to Variation 1;

FIG. 14 is a table illustrating a setting of recording medium information according to Variation 2;

FIG. 16 is a table illustrating a setting of recording medium information according to Variation 3;

FIGS. 17A and 17B (constituting FIG. 17) are a diagram illustrating an exemplary operation flow for position adjustment according to Variation 3;

FIGS. 20A and 20B (constituting FIG. 20) are a diagram illustrating an exemplary operation flow for position adjustment according to the second embodiment;

FIG. 21 is a table illustrating a setting of recording medium information according to Variation 1 of the second embodiment;

FIG. 22 is an explanatory graph of an effect exerted by a setting change of a correction coefficient α;

FIGS. 28A and 28B (FIG. 28) are a diagram illustrating an exemplary operation flow for position adjustment according to Variation 3 of the second embodiment.

Figure 1:
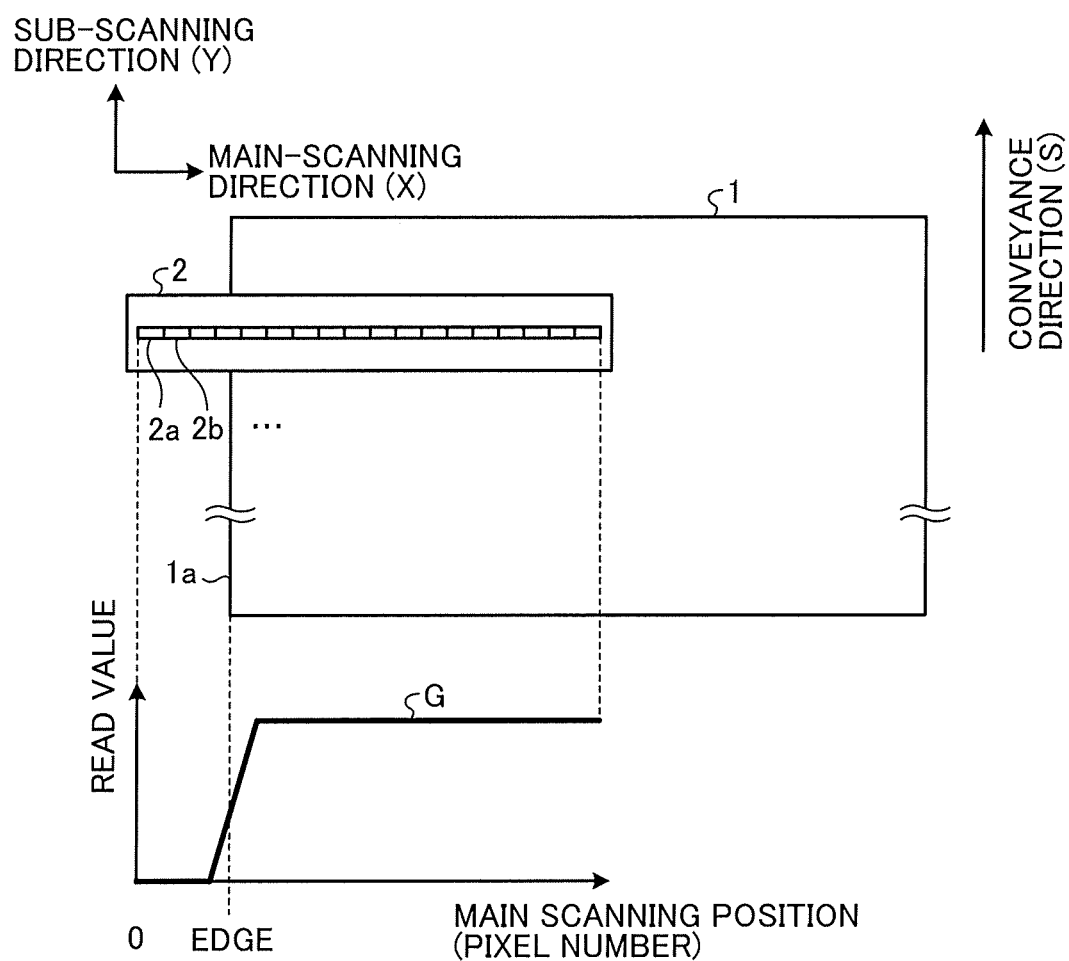
FIG. 1 is a diagram illustrating an exemplary arrangement of a reading device that detects an edge position of a recording medium in an image forming apparatus.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

Hereinafter, embodiments of a position detecting device, an image forming apparatus, and a method will be described with reference to the accompanying drawings. Here, the position detecting device indicates a unit device that detects a position of a medium, or a device for a predetermined purpose including the unit device. The device for a predetermined purpose indicates, for example, an image forming apparatus that detects a position of a recording medium (medium) such as recording paper and forms an image on the medium, and a factory automation (FA) device that detects, in a manufacturing line, a position of a component or the like (medium) on a belt conveyor and performs automatic assembly. Hereinafter, as the position detecting device, an example of application to an image forming apparatus (electrographic, ink-jet, etc.) will be described.

(Description of Outline)

In the image forming apparatus, when a position of the recording medium conveyed by a conveying unit deviates in a main-scanning direction at an image forming position, an image deviates from a predetermined reference position with respect to the recording medium. Therefore, in the image forming apparatus according to the present embodiment, before an image is formed on the recording medium, a position of an edge (corresponding to an "end portion" of a "medium") intersecting the main-scanning direction of the recording medium is detected, and positional deviation in the main-scanning direction is adjusted on the basis of the detected edge position. According to this adjustment, for example, it is possible to correct conveyance error (main scanning registration error) generated by design, deviation generated for each recording medium at the time of conveying the recording medium, and the like. In the present embodiment, detection of the edge position of the recording medium is performed by the position detecting device. A detection outline of the edge position of the recording medium will be described below with reference to FIGS. 1 to 3B.

FIG. 1 is a diagram illustrating an exemplary arrangement of a reading device that detects the edge position of the recording medium in the image forming apparatus. FIG. 1 illustrates a reading device 2 included in the position detecting device, and a recording medium 1 that passes through the position of the reading device 2. The recording medium 1 is conveyed in a conveying direction (arrow s). In FIG. 1, the conveying direction (arrow s) and a sub-scanning direction (Y) of the recording medium 1 are the same, and the direction orthogonal to the sub-scanning direction (Y) on the plane of the recording medium 1 is a main-scanning direction (X).

The reading device 2 is, for example, a contact image sensor (CIS) in which a plurality of image sensors (e.g., complementary metal oxide semiconductor (CMOS) image sensor) is arranged in a line. In FIG. 1, the reading device 2 is provided in such a manner that a reading surface faces one side of the recording medium 1 and is in proximity to the one side. Image sensors 2a, 2b, etc. of the reading device 2 are arranged in a line in the main-scanning direction (X). The reading device 2 irradiates an object to be read with illumination light, receives light reflected from respective positions at respective positions of the image sensors 2a, 2b, etc. in the main-scanning direction (X) with a photodiode, and outputs pixel signals at respective main scanning positions after photoelectric conversion as a signal series (image signal) in the main-scanning direction (X).

At a position facing the reading device 2, a dedicated light shielding member that shields/absorbs the illumination light from the reading device 2 is disposed. Further, as illustrated in FIG. 1, the reading device 2 is disposed across an edge 1a of the recording medium 1 in the main-scanning direction (X). With this configuration, a read value of light at the main scanning position (pixel number) of the portion that does not receive reflected light from the recording medium 1 during the period in which the recording medium 1 passes between the reading device 2 and the light shielding member becomes minute.

FIG. 1 illustrates a graph G illustrating an output value of each main scanning position (pixel number), which corresponds to the main-scanning direction (X) of the reading device 2. As illustrated in the graph G, the output value (read value) of each main scanning position (pixel number) of the reading device 2 while passing though the recording medium 1 shows a sudden change at the edge 1a. The higher the reflectance of the recording medium 1 becomes, the larger the difference between the output values at the edge 1a becomes, and a position of the edge 1a (edge position) can be detected by comparing the output value at each main scanning position with a preset threshold value. On the other hand, when the reflectance of the recording medium 1 is low, the difference between the output values at the edge 1a becomes small so that erroneous detection of the edge position increases by only comparing the output value at each main scanning position with a predetermined threshold value, whereby the edge position cannot be accurately detected.

Figure 2A:
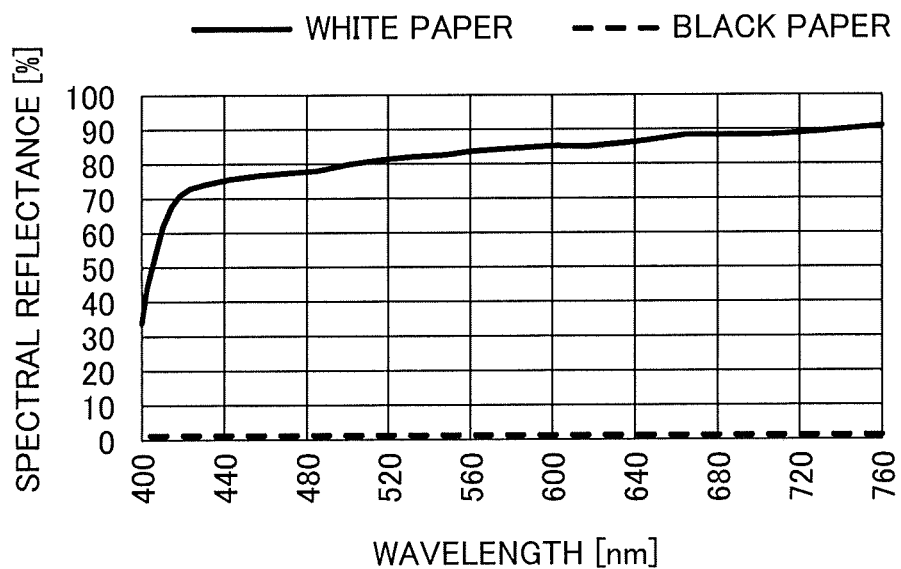
FIGS. 2A and 2B are graphs illustrating exemplary reflectance (spectral reflectance) for each wavelength of light that differs depending on density of the recording medium.
Figure 2B:
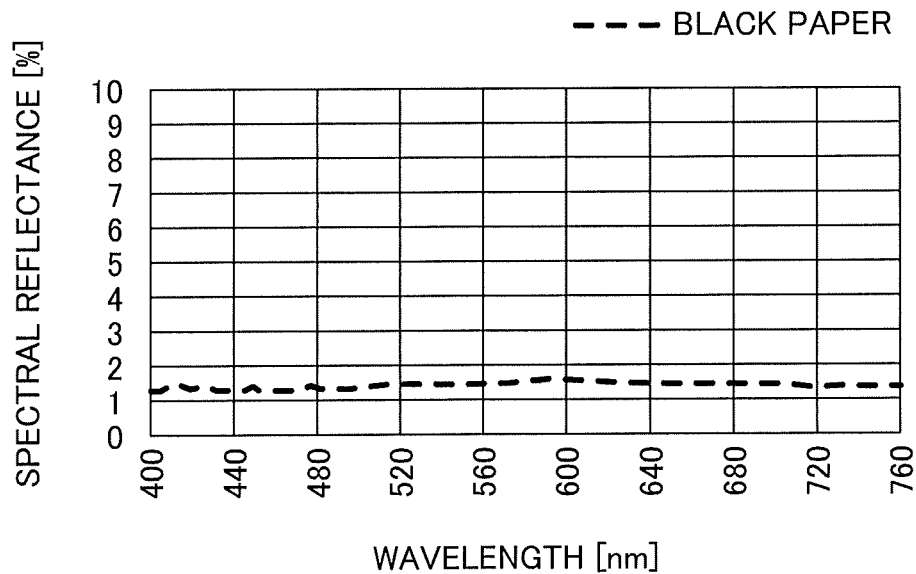

FIGS. 2A and 2B are graphs illustrating exemplary reflectance (spectral reflectance) for each wavelength of light that differs depending on density of the recording medium 1. FIG. 2A illustrates the spectral reflectance in the case where the recording medium 1 is "white paper" and "black paper". The solid line graph illustrated in FIG. 2A is a value indicating the spectral reflectance of the white paper. In this example, it is found that a high reflectance of approximately 70 to 90% is exhibited in most wavelength ranges within the visible light region (400 nm to 760 nm in FIGS. 2A and 2B). On the other hand, the broken line graph illustrates the spectral reflectance of the black paper whose density is relative to the white paper.

FIG. 2B illustrates the spectral reflectance of the black paper in a range different from that in FIG. 2A. As illustrated in FIG. 2B, it is known that, in the case of the black paper, a low spectral reflectance of 1 to 2% is exhibited within the visible light region in some cases.

An output signal amount of the received light of the pixels at respective main scanning positions is roughly proportional to a ratio of the spectral reflectance between respective densities of the recording medium 1. Therefore, the output signal amount obtained in the case where the black paper is read is very small as the ratio of white paper to black paper is nearly equal to 80:1 as compared with the white paper.

On an output signal of each pixel at each main scanning position, a dark current output (dark output), which is fixed pattern noise of the photodiode of each pixel, is superimposed. As a photoelectric conversion element of a line sensor typified by a contact image sensor, a charge-coupled device (CCD) image sensor or a CMOS image sensor is mainly used. Both of those sensors are known to have variation in signal output due to fixed pattern noise. A typical occurrence factor of the fixed pattern noise is variation in the dark current flowing in the photodiode in the sensor. It is known that the fixed pattern noise caused by the dark current is constantly generated even without light made incident on the photodiode, and its noise component is proportional to a light storage time and has temperature dependency.

Since the magnitude of the dark output differs for each photodiode as described above, there are variations among the pixels. In a case where the recording medium 1 is of a high density, the higher the density becomes, the smaller a signal amount of reflected light included in the output signal of each pixel becomes, which relatively comes closer to a signal amount of the dark output.

FIGS. 3A and 3B are explanatory graphs illustrating that the edge position is erroneously detected when the recording medium having high density (low reflectance) is read. FIG. 3A illustrates an exemplary case where the erroneous detection occurs in the setting of a low threshold value, and FIG. 3B illustrates an exemplary case where the erroneous detection occurs in the setting of a high threshold value.

FIGS. 3A and 3B illustrate an exemplary ratio of an output component of the pixel at each main scanning position in the case where the recording medium 1 having high density (low reflectance) is read. In each drawing, a shaded area g1 represents a dark output (dark output component), and a white area g2 represents a bright output (bright output component). Here, the bright output component indicates a reflected light component.

Since the photodiodes of respective pixels of the dark output component are not the same, there are variations in magnitude at respective main scanning positions, whereby the dark output component is not constant in the main-scanning direction. The bright output component becomes minute in the case of the recording medium 1 having high density (low reflectance), and the maximum value is influenced by the dark output component.

In this case, as illustrated in FIG. 3A, it is conceivable that the output (dark output component) other than the recording medium 1 exceeds the output (dark output component+ bright output component) at the edge 1a of the recording medium 1. In the case of a detection method of determining whether each pixel exceeds a predetermined threshold value from a main scanning end edge, if a low threshold value Th1 is set as in this case, the output value exceeds the threshold value Th1 at a position other than the recording medium 1 prior to the real edge position, and the edge position other than the real edge position is erroneously detected as the edge position.

In order to avoid this, as illustrated in FIG. 3B, a high threshold value Th2 is set in consideration of the maximum value of the dark output component of the pixel in all the pixels. However, even in that case, in a case where the output (dark output component+bright output component) at the edge 1a falls below the maximum value of the dark output component, the output value cannot exceed the threshold value Th2 at the real edge position, and the output value of the position within the recording medium 1 exceeds the threshold value Th2 at a position away from the edge 1a, whereby the edge position other than the real edge position is erroneously detected as the edge position.

In this manner, in a case where the dark output around the edge position of the recording medium is smaller than the dark output at another main scanning position, the recording medium having high density (low reflectance) cannot sufficiently secure the reflected light component, whereby the total sum of the dark output component and the bright output component cannot exceed the total output of the position where another dark output is large in some cases. Accordingly, in a case where the recording medium having high density (low reflectance) is the object to be read, an edge position other than the real edge position may be erroneously detected as the edge position only by changing the setting of the threshold value. The fact that there are variations in dark output values depending on the main scanning position is fatal to detect the edge position of particularly the recording medium having high density (low reflectance).

In the present embodiment, in a state where illumination is turned off, black shading data (black correction data) indicating the dark output of each pixel is generated, that is, output data of the reading device in the dark state is generated, and a value of the black correction data is subtracted from the output value at the time when the recording medium is illuminated and read. In this manner, influence of the fixed pattern noise of each pixel included in the output data in the dark state is canceled, thereby detecting an end position (edge) of various kinds of recording media, particularly a recording medium having a poor light receiving amount of an image sensor typified by paper having high density (low reflectance), highly accurately.

Figure 4:
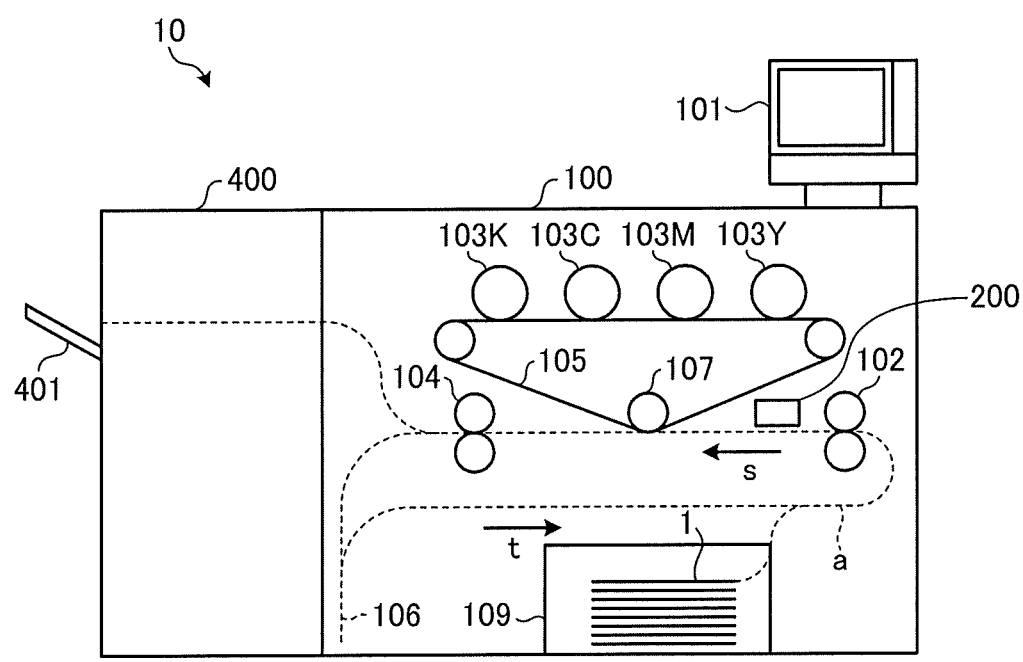
FIG. 4 is a diagram illustrating an example of a general arrangement of an image forming apparatus according to a first embodiment.

FIG. 4 is a diagram illustrating an example of a general arrangement of the image forming apparatus according to the first embodiment. FIG. 4 schematically illustrates the general arrangement of a printing system as an example of the image forming apparatus. A printing system 10 illustrated in FIG. 4 includes a printing device 100, a position detecting device 200, and a stacker 400.

The printing device 100 includes an operation panel 101, tandem electrophotographic image formation units 103Y, 103M, 103C, and 103K, a transfer belt 105, a secondary transfer roller 107, a sheet feeder 109, a conveyance roller pair 102, a fixing roller 104, and an inversion path 106. Among them, the image formation units 103Y, 103M, 103C, and 103K, the transfer belt 105, the secondary transfer roller 107, the conveyance roller pair 102, and the fixing roller 104 mainly correspond to an "image forming device".

The operation panel 101 is an operation display that performs various operation inputs on the printing device 100 and the position detecting device 200, and displays various screens.

Each of the image formation units 103Y, 103M, 103C, and 103K has an image formation process (charging process, exposure process developing process, and cleaning process), and forms a toner image in the image formation process to transfer the toner image to the transfer belt 105. In the embodiment illustrated in FIG. 1, the image formation unit 103Y has a yellow toner image, the image formation unit 103M has a magenta toner image, the image formation unit 103C has a cyan toner image, the image formation unit 103K has a black toner image, and the toner images of respective colors from the image formation units 103Y, 103M, 103C, and 103K are superimposed and transferred onto the transfer belt 105. Note that the type and number of colors of the toner are not limited thereto. The type and number of colors of the toner may be modified as appropriate.

The transfer belt 105 travels in a predetermined direction, and conveys the toner image superimposed and transferred from the image formation units 103Y, 103M, 103C, and 103K (full-color toner image) to a secondary transfer position of the secondary transfer roller 107. For example, the transfer belt 105 travels in a counterclockwise direction, and the yellow toner image, the magenta toner image, the cyan toner image, and the black toner image are superimposed and transferred in that order, thereby conveying the full-color toner image to the secondary transfer position.

The sheet feeder 109 includes a paper feeding tray in which a plurality of recording media 1 to be an object to be conveyed and processed is stacked and stored, and feeds the recording medium 1 from the paper feeding tray one by one onto a conveyance path a. The recording medium 1 is, for example, recording paper (transfer paper). In addition to this, it may be another medium capable of recording an image, such as coated paper, thick paper, an overhead projector (OHP) sheet, a plastic film, prepreg, and copper foil.

Note that, in addition to the sheet feeder 109, a sheet feeder capable of storing different types of recording media 1 may be further connected as an external option, and the recording medium to be processed may be alternately or selectively switched and conveyed from a plurality of sheet feeders including the sheet feeder 109.

The conveyance roller pair 102 conveys the recording medium 1 fed by the sheet feeder 109 in the direction of the arrow s of the conveyance path a.

The secondary transfer roller 107 collectively transfers the full-color toner image conveyed by the transfer belt 105 onto the recording medium 1 conveyed by the conveyance roller pair 102 at the secondary transfer position.

The fixing roller 104 heats and pressurizes the recording medium 1 onto which the toner image is transferred to fix the toner image on the recording medium 1.

In the case of single-sided printing, the printing device 100 sends the recording medium 1 onto which the toner image is fixed to the stacker 400. In the case of double-sided printing, the printing device 100 sends the recording medium 1 onto which the toner image is fixed to the inversion path 106.

The inversion path 106 performs switch-back on the sent recording medium 1 to reverse the front and back of the recording medium 1, and conveys it in the direction of the arrow t. The recording medium 1 conveyed by the inversion path 106 is again conveyed by the conveyance roller pair 102 in the direction of the arrow s, the toner image is transferred onto the opposite side surface by the secondary transfer roller 107, the toner image is fixed by the fixing roller 104, and then the recording medium 1 is sent to the stacker 400.

The stacker 400 stacks the recording medium 1 ejected from the printing device 100 in the tray 401.

The position detecting device 200 includes the reading device 2 (see FIG. 1) in which a plurality of image sensors is arranged in the main-scanning direction (X) of the recording medium 1 with a reading surface facing the conveyance path a of the recording medium 1. The position detecting device 200 detects the position of the edge along the sub-scanning direction (Y) of the recording medium 1 to be processed on the basis of the output value from the reading device 2, and corrects positional deviation of the recording medium 1 in the main-scanning direction (X).

Figure 5:
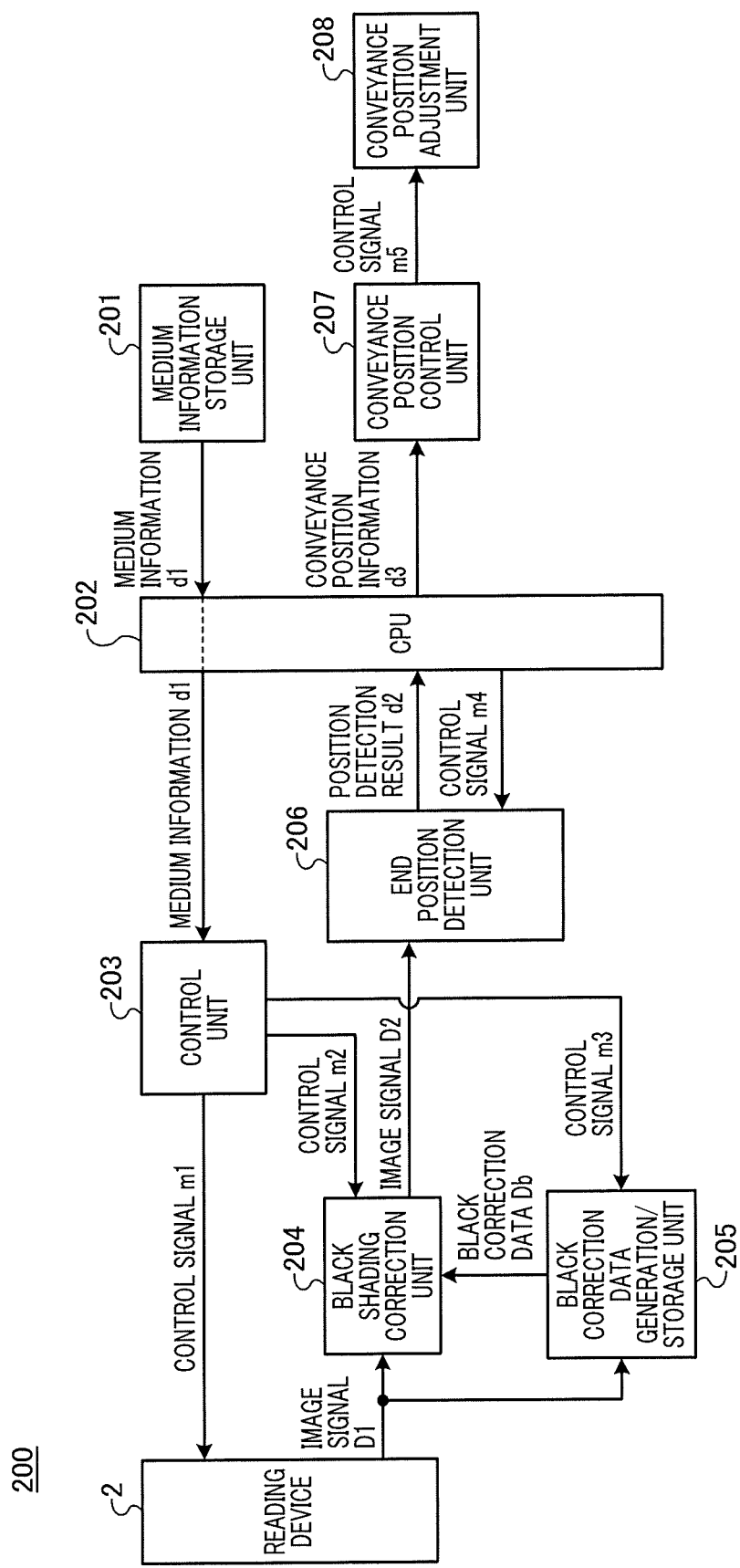
FIG. 5 is a diagram illustrating an exemplary configuration of a position detecting device.

FIG. 5 is a diagram illustrating an exemplary configuration of the position detecting device 200. As illustrated in FIG. 5, the position detecting device 200 includes a medium information storage unit 201, a central processing unit (CPU) 202, a control unit 203, the reading device 2, a black shading correction unit 204, a black correction data generation/storage unit 205, an end position detector 206, a conveyance position control unit 207, and a conveyance position adjustment unit 208. Among those units, the black shading correction unit (corresponding to "black correction unit") 204 and the black correction data generation/storage unit (corresponding to "black correction data generation unit") 205 mainly correspond to a "black correction processor". The CPU 202 and the end position detector 206 mainly correspond to a "position detector". The medium information storage unit 201 mainly corresponds to a "storage". The conveyance position adjustment unit 208 mainly corresponds to a "correction unit".

The medium information storage unit 201 stores information (recording medium information d1) associated with the sheet feeder 109 used in a print job and the recording medium 1 set in the sheet feeder 109. Each piece of information is set through a user interface such as the operation panel 101 (see FIG. 4). Note that details of the information associated with the recording medium set in the sheet feeder 109 (recording medium information d1) will be described later.

The CPU 202 obtains the recording medium information d1 used in the print job from the medium information storage unit 201, and notifies the control unit 203 thereof.

According to the recording medium information d1 notified from the CPU 202, the control unit 203 sets an operation condition of the reading device 2 using a control signal m1, sets an operation condition of the black shading correction unit 204 using a control signal m2, and sets an operation condition of the black correction data generation/storage unit 205 using a control signal m3.

The reading device 2 operates according to a predetermined operation condition setting input from the control unit 203 using the control signal m1, and outputs read image signal D1 to the black shading correction unit 204 and the black correction data generation/storage unit 205.

The black correction data generation/storage unit 205 obtains, with an optional timing input by the control signal m3 as a starting point, the image signal D1 of the predetermined number of lines, and generates black correction data Db on the basis of the obtained image signal D1. For example, the number of acquisition lines of the image signal is set in advance in a register included in the control unit 203, and the control unit 203 asserts the control signal (black correction data generation area signal) corresponding to the set number of lines using the control signal m3. The black correction data generation/storage unit 205 obtains the image signal D1 of the predetermined number of lines, calculates an average value or a mode value of the predetermined number of lines for each pixel, and the like to generate the black correction data Db from which a random noise component is removed. Note that this method is an example, and the method of generating the black correction data Db is not limited thereto.

Further, the black correction data generation/storage unit 205 includes a random access memory (RAM), and stores and holds the generated black correction data Db in the RAM.

Note that, in a case where the black correction data Db is generated for each pixel using data of the predetermined number of lines, although highly accurate black correction data can be obtained, line memory capacity corresponding to the number of pixels is required. In view of such circumstances, in order to reduce the line memory capacity, a method of generating the black correction data Db in units of a plurality of pixels may be employed. For example, in the case of a reading device having a configuration in which a plurality of sensor IC chips in which a plurality of pixels is arrayed is arranged in the main-scanning direction, like the contact image sensor (CIS), a method of generating the black correction data Db for each IC chip is exemplified.

The black shading correction unit 204 performs black correction on an image using the following formula (1). Specifically, the black shading correction unit 204 performs the black correction in which the black correction data Db stored and held in advance by the black correction data generation/storage unit 205 is read and the black correction data Db is subtracted from the image signal D1 output from the reading device 2. An image signal D2 after the black correction is output to the end position detector 206.

$$D2(n)=D1(n)-Db(n) \quad (1)$$

Where n is a pixel number.

Although the formula (1) is a calculation formula for subtracting the black correction data Db for each pixel, the calculation formula may be changed as appropriate depending on a method of generating the black correction data, such as a method of generation for each of a plurality of pixels.

The control signal m2 is input from the control unit 203 to the black shading correction unit 204. In the process of the black correction, whether to execute by the control signal m2 or not may be switched as appropriate.

Upon receipt of a detection start command from the CPU 202 using the control signal m4, the end position detector 206 detects the edge position using the image signal D2 input from the black shading correction unit 204, and notifies the CPU 202 of a detection result (position detection result) d2.

The CPU 202 extracts a difference amount relative to the reference position on the conveyance path a on the basis of the detection result d2 of the end position detector 206, and outputs conveyance position information d3 of the recording medium 1 to the conveyance position control unit 207.

In accordance with the conveyance position information d3 from the CPU 202, the conveyance position control unit 207 controls drive of the conveyance position adjustment unit 208 using the control signal m5 for adjusting the position.

The conveyance position adjustment unit 208 corrects, according to the control using the control signal m5, the deviation of the recording medium 1 on the conveyance path a in the main-scanning direction (X) to the reference position on the basis of the position adjustment of the recording medium 1. According to this correction, the recording medium 1 corrected to the reference position is sent to the secondary transfer roller 107. Note that the conveyance position adjustment unit 208 may be provided in the position detecting device 200, or may be provided in the printing device 100. In the case of being provided in the printing device 100, the conveyance position control unit 207 of the position detecting device 200 is capable of controlling the conveyance position adjustment unit 208.

Figures 6, 7:
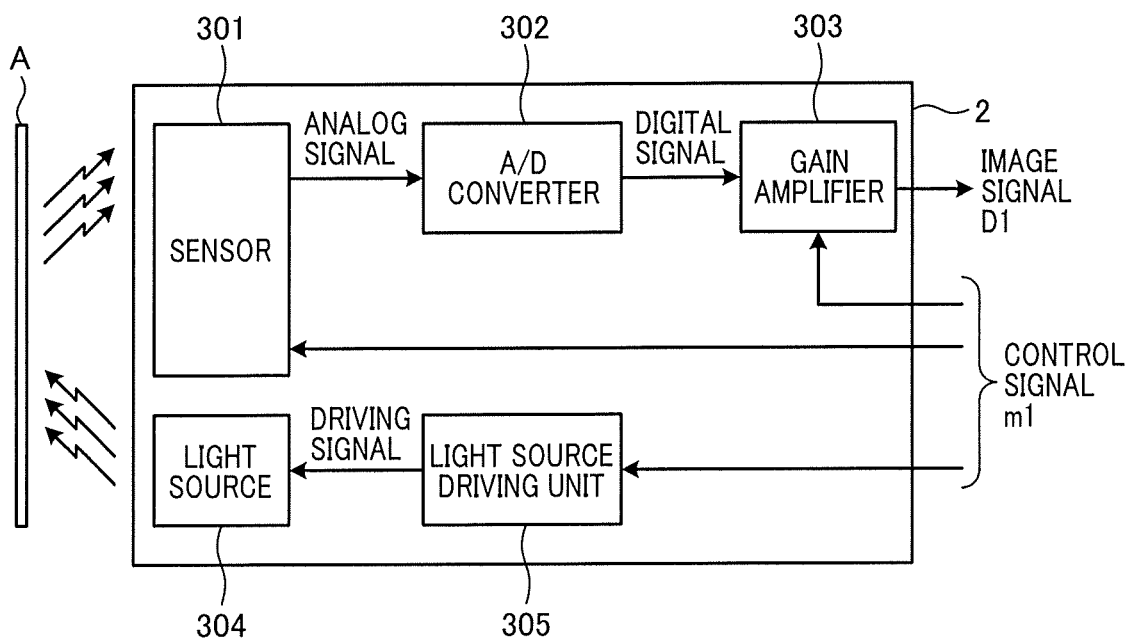
FIG. 6 is a diagram illustrating an exemplary configuration block of a reading device.
FIG. 7 is a table illustrating exemplary recording medium information stored in a medium information storage unit.

FIG. 6 is a diagram illustrating an exemplary configuration block of the reading device 2. The reading device 2 illustrated in FIG. 6 mainly includes a sensor 301, an analog/digital (A/D) converter 302, a gain amplifier 303, a light source 304, and a light source driving unit 305.

The sensor 301 is a sensor that receives, using the photodiode, light reflected by an object to be read A such as the recording medium 1 at each pixel, and outputs a read value photoelectrically converted at each pixel as an analog signal.

The A/D converter 302 is a circuit that converts the read value of each pixel output from the sensor 301 as the analog signal into a digital signal.

The gain amplifier 303 is a gain amplifier that amplifies or attenuates a signal level after the digital conversion by the A/D converter 302 to perform adjustment.

The light source 304 is a light source that irradiates the object to be read A with illumination light.

The light source driving unit 305 is a circuit that turns on/off the light source 304 and adjusts a light emission amount and the like.

As illustrated in FIG. 6, the control signal m1 includes control signals for the sensor 301, the light source driving unit 305, and the gain amplifier 303.

The control signal of the sensor 301 is a line synchronization signal (nearly equal to light storage time) for driving and performing control in an optional cycle.

The control signal of the light source driving unit 305 is a signal indicating a timing of turning on/off, and a signal indicating the light emission amount.

The control signal of the gain amplifier 303 is a control signal that sets an amplification/attenuation amount of the gain amplifier.

Note that, although FIG. 6 illustrates the configuration in which the gain amplifier 303 is disposed at the subsequent stage of the A/D converter 302, it may be any configuration as long as the output signal amount of the sensor can be adjusted (amplified/attenuated). Therefore, the gain amplifier 303 may be disposed in the former stage of the A/D converter 302 to adjust the analog signal amount.

By amplifying the output signal of the image sensor using the gain amplifier 303 or the like, it becomes possible to cope with the recording medium 1 having higher density (low reflectance), whereby more reliable position detection can be implemented.

Examples of a method of adjusting the light receiving amount per unit time of the sensor include a method of adjusting a current value flowing the light source (e g, light-emitting diode (LED)), a method of adjusting a line synchronization signal cycle (light storage time), and a method of adjusting lighting time (light storage time) within one line cycle of the line synchronization signal.

In terms of enhancing the signal output, it is conceivable to change the gain (amplification factor) to have the same signal output ratio. However, when the storage time is doubled, the signal output is doubled, and light shot noise component included in the signal output is doubled by a square root of two. It is also generally known that, when the gain is doubled, the signal output is doubled, and the light shot noise component included in the signal output is doubled. That is, in order to adjust the output signal amount of the image sensor without substantially impairing a signal/noise (S/N) ratio of the image data, it is preferable to adjust the signal output amount using the light emission amount of the light source, the light storage time of the sensor, and the like rather than to use the gain amplifier that amplifies the noise component included in the signal output with the same amplification factor. For that reason, adjustment of the light emission amount of the light source and the light storage time of the sensor is preferentially performed rather than the gain. As a result, it becomes possible to adjust the image sensor output signal amount without substantially impairing the signal quality (S/N ratio).

FIG. 7 is a table illustrating exemplary recording medium information d1 stored in the medium information storage unit 201. In FIG. 7, types of the recording medium 1 are classified into two types of a high-density medium and a low-density medium, and the setting for determining the corresponding operation condition, that is, in this example, whether the black shading correction is performed, the light storage time, and the gain setting value, are indicated in a list.

Among various types of recording media, for example, in terms of recording media such as color paper of red, blue, green, black, and the like (especially high-density color), an OHP sheet having high light transmittance (low reflectance), and a clear file/holder, the demand for improvement in print quality has been increasing year by year in the print market such as production printing. The demand for improvement in print quality is high with respect to the color paper, in particular, black paper, the OHP sheet, glossy paper/metallic paper having a dominant specular reflection component (regular reflection component) and a poor diffuse reflection component, and the like. In a case where such a recording medium is an object of the edge detection, reflected light from the recording medium is insufficient depending on a wavelength of light emitted from the light source and the conditions caused by the recording medium such as a material and a color of a recording member. In particular, the black paper, the OHP sheet, and the like have very poor reflected light amount, whereby the sensor cannot obtain sufficient signal output. For that reason, in the example illustrated in FIG. 7, the black paper, the OHP sheet, and the like are classified as the "high-density medium", and general white paper and the like are classified as the "low-density medium".

In the setting illustrated in FIG. 7, there are a setting of "to be executed (ON)" the black shading correction, and a setting of "not to be executed (OFF)" the black shading correction. In the "low-density medium", the output level of the bright output is much higher than that of the dark output, and the detection accuracy of the edge position using the threshold value is high. Accordingly, when the "low-density medium" is selected, the black shading correction is set "not to be executed (OFF)".

Further, when the "low-density medium" is selected, in the case of the white paper or the like, the bright output from the reading device 2 is much higher than the dark output, and it is expected to be sufficient to detect the edge position. Accordingly, in the "low-density medium" setting, a low value is set as indicated by the storage time 2 (200 μsec) and the gain 2 (same magnification).

On the other hand, when the "high-density medium" is selected, there is a possibility that the bright output from the reading device 2 is not sufficient to perform position detection. Accordingly, in the "high-density medium" setting, a high value is set as indicated by the storage time 1 (600 μsec) and the gain 1 (doubled). That is, when the "high-density medium" is selected, it operates to have the signal output amount six times larger than that in the case of the "low-density medium" being selected.

The setting illustrated in FIG. 7 is an example, and the setting for determining the operation condition is not limited thereto. An appropriate setting may be determined on the basis of the specification of the reading device 2 to be used.

Figure 8:
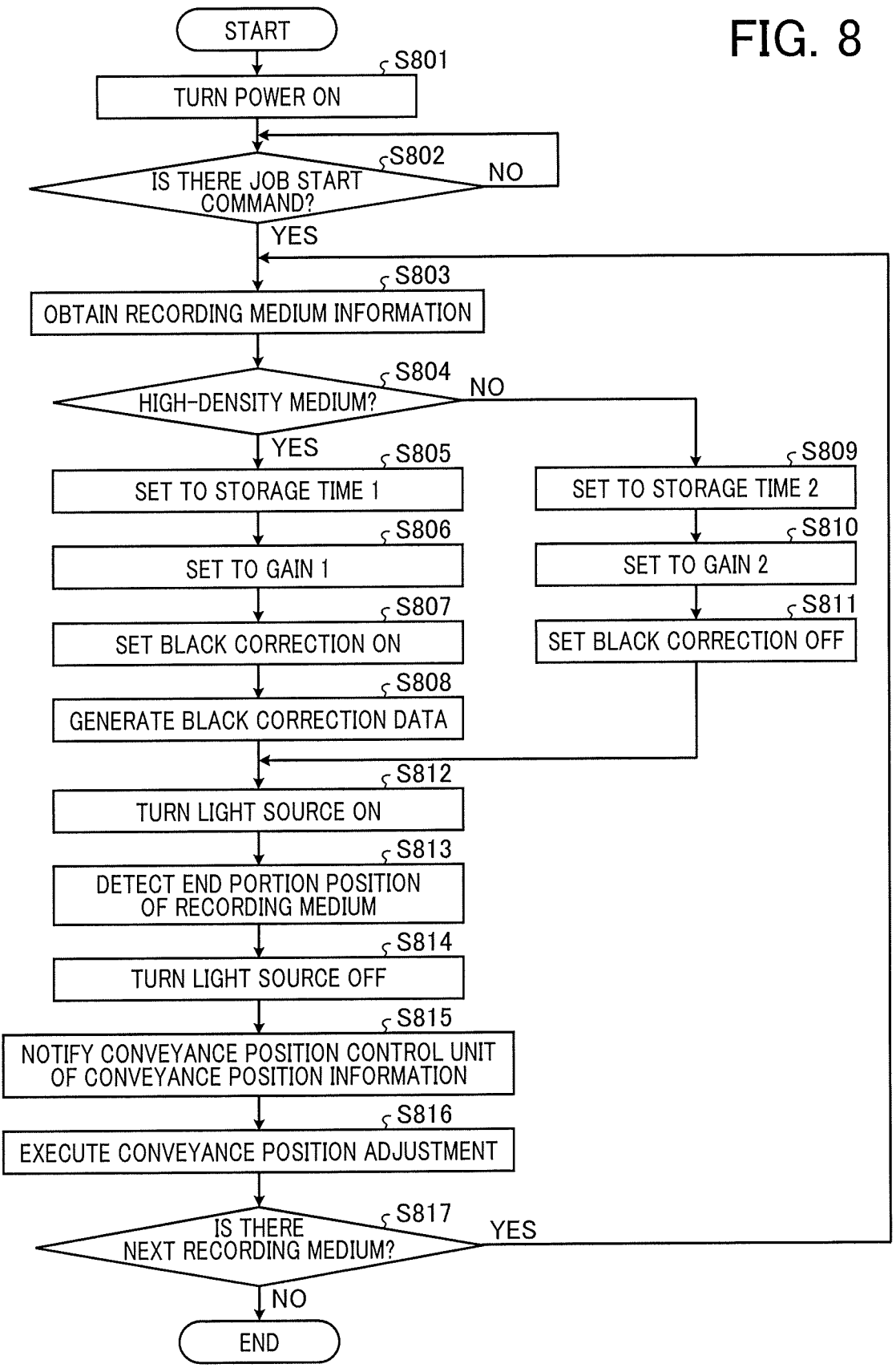
FIG. 8 is a diagram illustrating an exemplary operation flow for position adjustment performed by the position detecting device.

FIG. 8 is a diagram illustrating an exemplary operation flow for position adjustment performed by the position detecting device 200. As illustrated in FIG. 8, after power is supplied to the reading device 2 (S801), the CPU 202 is in a standby state until it receives a print job start command from a user (No in S802).

When the start of the print job is determined by an operation key or the like (Yes in S802), the CPU 202 obtains, from the medium information storage unit 201, the information (recording medium information d1) associated with the sheet feeder 109 used in the job and the recording medium 1 set in the sheet feeder 109, and notifies the control unit 203 thereof (S803).

The control unit 203 determines, from the recording medium information d1 notified by the CPU 202, whether the recording medium 1 is a high-density medium (S804). Hereinafter, it is assumed that the control unit 203 operates in a first mode when the black shading correction function of the recording medium information d1 is ON, and operates in a second mode when the black shading correction function of the recording medium information d1 is OFF.

When the reading medium 1 is determined to be the high-density medium (Yes in S804), the control unit 203 sets the storage time 1 (line synchronization signal cycle) and the gain 1 to the reading device 2 using the control signal m1 (S805 and S806).

Further, the control unit 203 sets the function of the black shading correction unit 204 to ON using the control signal m2 (S807).

Subsequently, the control unit 203 causes the black correction data generation/storage unit 205 to generate black correction data using the control signal m3 (S808). At this timing, the light source 304 is off, whereby the image signal D1 output from the reading device 2 is data indicating the dark output of each main scanning position. The black correction data generation/storage unit 205 holds the data indicating the dark output at the main scanning position as the black correction data Db.

On the other hand, when the reading medium 1 is determined to be the low-density medium that is not the high-density medium (No in S804), the control unit 203 sets the storage time 2 (line synchronization signal cycle) and the gain 2 to the reading device 2 using the control signal m1 (S809 and S810).

Further, the control unit 203 sets the function of the black shading correction unit 204 to OFF using the control signal m2 (S811).

Note that the processing illustrated in steps S808 or S811 is executed until the time at which the recording medium 1 fed by the sheet feeder 109 is conveyed to the execution position of the edge position detection (edge position detection execution position).

After the processing of step S808 or step S811, the control unit 203 turns on the light source 304 of the reading device 2 using the control signal m1 (S812). From this lighting, the image signal D1 including the bright output that is the reflected light component of the object to be read is output from the reading device 2. When the function of the black shading correction unit 204 is ON, the image signal D2 output from the black shading correction unit 204 to the end position detector 206 is the output of the bright output component in which the black correction data Db held by the black correction data generation/storage unit 205 is subtracted. When the function of the black shading correction unit 204 is OFF, the image signal D1 output from the reading device 2, that is, (dark output component+bright output component) is output.

When the recording medium 1 is conveyed to the edge position detection execution position, the CPU 202 obtains the detection result d2 of the edge position from the end position detector 206 (S813). Specifically, the CPU 202 transmits the detection start command to the end position detector 206 using the control signal m4 at a timing when the recording medium 1 is conveyed to the edge position detection execution position. Upon reception of the detection start command, the end position detector 206 detects the edge position of the recording medium 1 on the basis of the image signal D2 input at that time, and notifies the CPU 202 of the detection result d2.

Upon completion of the detection of the edge position performed by the end position detector 206, the CPU 202 turns off the light source 304 that has been turned on (S814).

Subsequently, the CPU 202 extracts the difference amount relative to the reference position on the conveyance from the edge position indicated by the detection result d2, and notifies the conveyance position control unit 207 of the difference amount as the conveyance position information d3 (S815).

The conveyance position control unit 207 controls the conveyance position adjustment unit 208 using the control signal m5 on the basis of the conveyance position information d3, and adjusts the deviation of the recording medium 1 in the main-scanning direction to the reference position (S816). Accordingly, the recording medium 1 is conveyed to the secondary transfer roller 107 in the state adjusted to the reference position.

Subsequently, the CPU 202 determines whether the recording medium 1 of the next page of the recording medium 1 exists (S817). When the recording medium 1 of the next page does not exist (No in S817), the job is terminated. When the recording medium 1 of the next page exists (Yes in S817), the process proceeds to S803, and the adjustment processing of the edge position is performed in a similar manner.

Figure 9A:
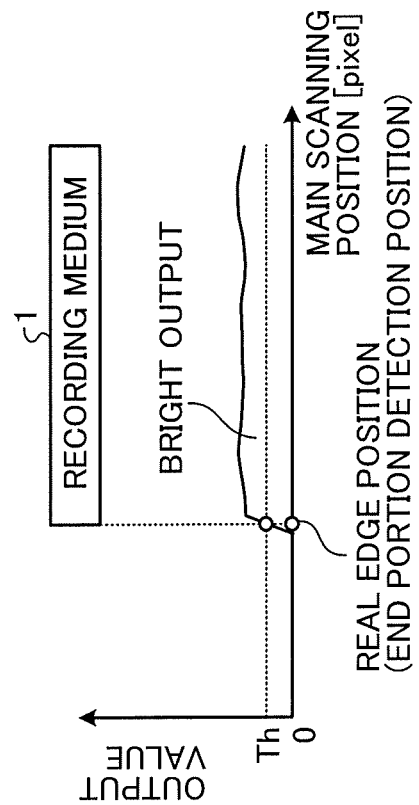
FIGS. 9A and 9B are graphs for illustrating an effect of improving detection accuracy in the case where correction (black correction) using black correction data is performed on the recording medium having high density (low reflectance)
Figure 9B:
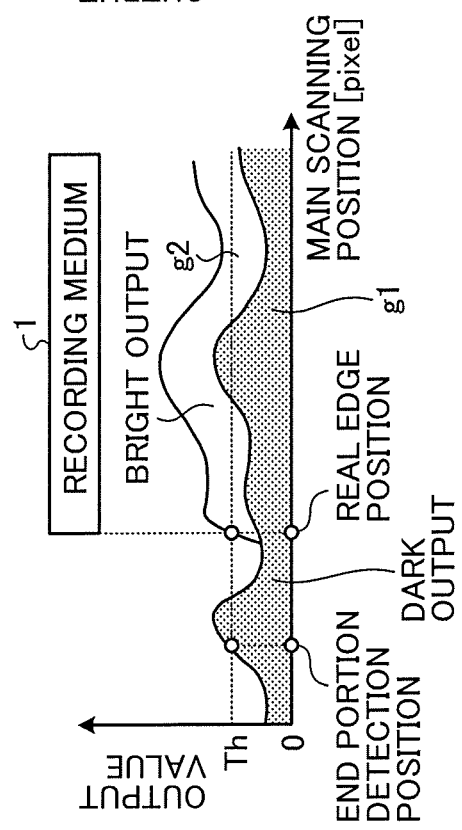

FIGS. 9A and 9B are graphs for illustrating an effect of improving detection accuracy in the case where the correction (black correction) using the black correction data is performed on the recording medium having high density (low reflectance). FIG. 9A is a graph (comparative graph of effects) of the case where the black correction is not performed on the recording medium having high density (low reflectance), and FIG. 9B is a graph of the case where the black correction is performed on the recording medium having high density (low reflectance).

In FIG. 9A, as described above, even when the threshold value Th is appropriately selected, the real edge position of the recording medium 1 cannot be detected due to the variation in the dark output, and the position at which the dark output value is large is erroneously detected.

In FIG. 9B, the black correction is executed to remove the dark output component, and only the bright output that is the reflected light component from the recording medium 1 remains as the signal output component. Therefore, the output value other than the recording medium 1 can be suppressed to a low level, and signal output fluctuation in the main-scanning direction in the recording medium 1 can also be suppressed to a low level. In this case, since the output difference largely changes only at the real edge position, the setting range of the threshold value Th can be broadened, whereby the result that the true edge position of the recording medium 1=an end portion detection position can be constantly obtained.

Note that, when the low-density medium different from the high-density medium is targeted, the output value of the bright output is very high compared with the dark output. Therefore, the real edge position can be accurately detected without generating the black correction data and executing the black correction. By differentiating the operation condition for the black correction according to the density of the recording medium 1, the processing time required for the black correction can be shortened. In the print market, especially in the production printing field, a printing speed (productivity) is a very important factor, and the setting of changing the operation condition for the black correction contributes to improvement in printing speed.

As described above, in the present embodiment, the edge position can be highly accurately detected with respect to various kinds of recording media, particularly the recording medium having the poor light receiving amount of the image sensor typified by the paper having high density (low reflectance) such as the black paper and the OHP sheet. Black paper and transparent paper (OHP sheet, clear file/holder, etc.) having absolutely poor diffuse reflectance are frequently used in the print market. Accordingly, the above-described first mode is applied to such a recording medium, whereby the highly accurate and highly reliable position detection can be implemented.

Incidentally, as a unit to avoid detection accuracy deterioration due to the influence of the fixed pattern noise, a method in which a size of the recording medium is taken in beforehand and the end position detection range (main scanning range) of the recording medium is limited on the basis of the deviation amount of the conveyance position in the main-scanning direction that can be generated due to the design of the conveyance path configuration is conceivable. With such a method, the influence of the fixed pattern noise included in the dark output of the image sensor may be reduced to some extent.

However, as described above, since the fixed pattern noise has different characteristics for each reading device, it is unknown what the signal output distribution (main scanning distribution) in the main-scanning direction will be for each reading device. Therefore, there is no guarantee that the influence of the fixed pattern noise is not affected within the end position detection range even when the end position detection range is limited.

Meanwhile, in the present invention, the black correction data is generated and held in advance on the basis of the dark output regardless of the main scanning distribution of the dark output, whereby the main scanning distribution (fixed pattern noise) of the dark output is obtained for each reading device, and the black correction data is subtracted and removed at the time of the end position detection. Therefore, it is not affected by the main scanning distribution of the dark output and the individual difference, and the highly reliable and highly accurate position detection accuracy can be secured, whereby it goes without saying that it is an excellent technique from the viewpoint of improving the position detection accuracy.

Note that, when the signal output amount is increased, it is preferable to reacquire the dark output to generate the black correction data. Examples of a method of increasing the output signal amount include the following two methods.

However, an adverse effect may be caused in the case where the black correction data is not generated from the reacquired dark output.

(1) One method of increasing the output signal amount is to adjust (enlarge) the light receiving amount received by the sensor in the reading device 2. In this case, for example, the dark current flowing to the sensor increases in proportion to the expansion of the light storage time. As a result, the fixed pattern noise changes before and after the storage time change, and the dark output indicates different values before and after the storage time change. That is, in the case where the storage time changes, the black correction data generated by the dark output before the change does not correspond to the one after the change. If the same black correction data is used before and after the storage time change, it causes an adverse effect of detection accuracy deterioration (or erroneous detection).

(2) Another method of increasing the output signal amount is to amplify the output signal from the sensor by the gain amplifier. In this case as well, a similar adverse effect may occur if the same black correction data is used before and after the amplification. This adverse effect will be described with reference to FIGS. 10A and 10B.

Figure 10A:
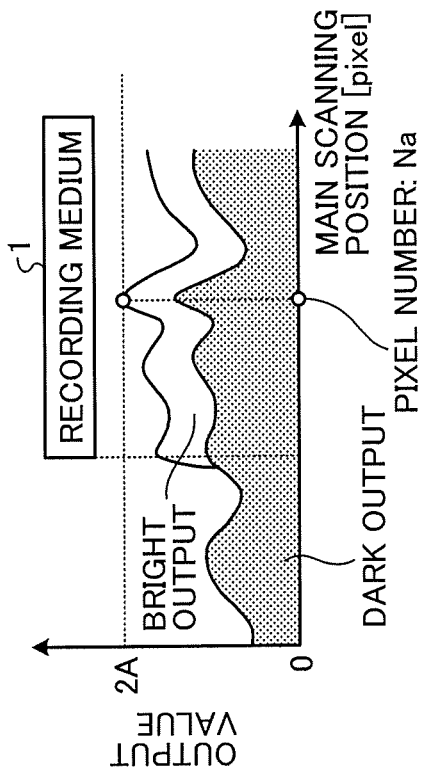
FIGS. 10A and 10B are explanatory graphs of an adverse effect caused by adjustment of an output signal amount of the reading device.
Figure 10B:
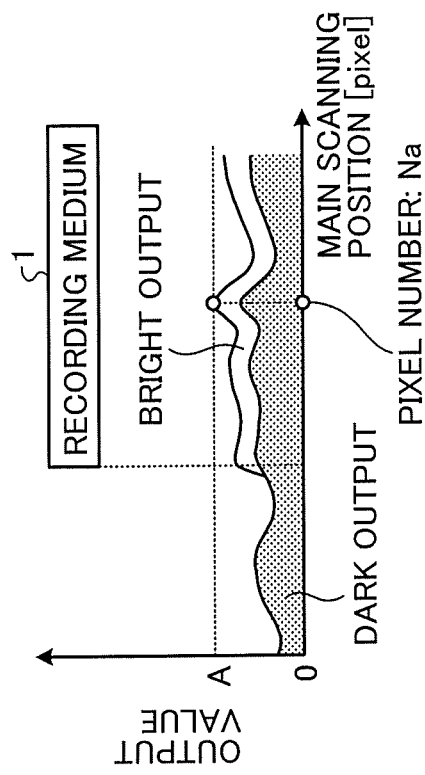

FIGS. 10A and 10B are explanatory graphs of the adverse effect caused by the adjustment of the output signal amount of the reading device 2. FIGS. 10A and 10B illustrate how the output components (dark output and bright output) change when the amplification factor is changed from the same magnification to be doubled using the gain amplifier. FIG. 10A illustrates a case where the amplification factor is the same magnification, and FIG. 10B illustrates a case where the amplification factor is doubled.

From FIGS. 10A and 10B, it can be understood that the output value of all pixels is doubled when the amplification factor is changed from the same magnification to be doubled using the gain amplifier. For example, as illustrated in FIG. 10A, the peak value=A in all main scanning pixels of the pixel number=Na becomes, as illustrated in FIG. 10B, the peak value=2A by double amplification.

In such a case, when the black correction (removal of dark output component) is performed using the black correction data generated by the dark output at the time when the amplification factor is the same magnification while the amplification factor is doubled, the dark output at the time when the amplification factor is doubled cannot be completely removed, whereby the adverse effect of the detection accuracy deterioration may be caused.

Therefore, when the reading operation condition changes according to the recording medium (paper type) to be read, the dark output is reacquired each time, and the black correction data is regenerated on the basis of the reacquired dark output. With this configuration, further improvement in detection accuracy can be expected.

(Variation 1)

A variation of recording medium information d1 (see FIG. 7) and an operation flow thereof (see FIG. 8) at that time will be described as Variation 1 of the first embodiment. Note that, in the following descriptions, parts different from the first embodiment will be mainly described, and common parts will be denoted by the same reference signs or the like to omit descriptions thereof as appropriate.

FIG. 11 is a table illustrating a setting of the recording medium information d1 according to Variation 1. The setting of the recording medium information d1 according to Variation 1 is different in that a setting of black shading correction with respect to a "low-density medium" is changed from "not to be executed (OFF)" to "to be executed (ON)". That is, in Variation 1, the black correction is performed on all types of recording media regardless of the type of a recording medium.

Figure 12:
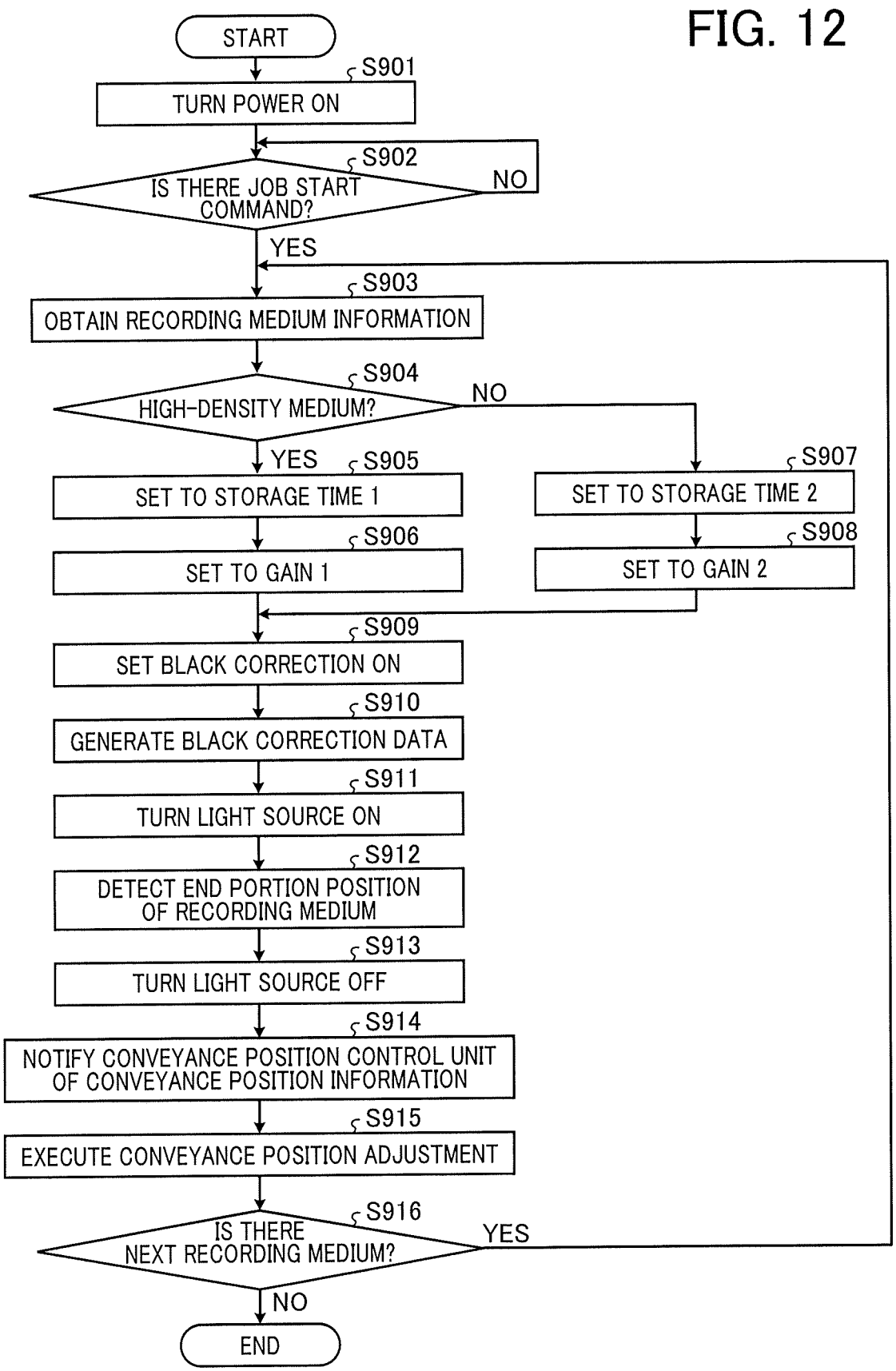
FIG. 12 is a diagram illustrating an exemplary operation flow for position adjustment according to Variation 1.

FIG. 12 is a diagram illustrating an exemplary operation flow for position adjustment according to Variation 1. In the present operation flow, a flow is different in that a control unit 203 determines a low-density medium (No in S904) in step S904 corresponding to step S804 in FIG. 8, sets "storage time 2" and "gain 2" in step S907 and step S908 corresponding to step S809 and S810 in FIG. 8, and then the process proceeds to step S909 corresponding to step S807 in FIG. 8, processing in step S910 corresponding to step S808 in FIG. 8 is performed, and the processing in step S911 corresponding to step S812 in FIG. 8 is performed.

That is, with respect to the low-density medium, after the "storage time 2" and "gain 2" are set, the control unit 203 sets a function of a black shading correction unit 204 to ON using a control signal m2 to generate black correction data, and then turns on a light source 304.

Other flows correspond to the operation flow of the first embodiment (see FIG. 8). Accordingly, further descriptions will be duplicate and thus omitted.

In this manner, in Variation 1, the black correction data is generated regardless of the type of a recording medium 1 to perform black correction. However, it is set to be performed after the setting of the storage time and the gain, which affects dark output, is complete.

That is, in Variation 1, an operation condition at the time of generating the black correction data differs depending on the type of the recording medium 1, whereby appropriate black correction data can be constantly generated. Therefore, further improvement in detection accuracy can be expected not only for the high-density medium but also for the low-density medium.

(Variation 2)

In Variation 1, both the low-density medium and the high-density medium are subject to the black correction, and the storage time is differentiated between the low-density medium and the high-density medium in the operation condition at the time of generating the black correction data. In Variation 2, an example of changing the number of acquisition lines according to a change of a storage time will be described. Note that, in the following descriptions, parts different from the first embodiment and Variation 1 will be mainly described, and common parts will be denoted by the same reference signs or the like to omit descriptions thereof as appropriate.

Figure 13A:
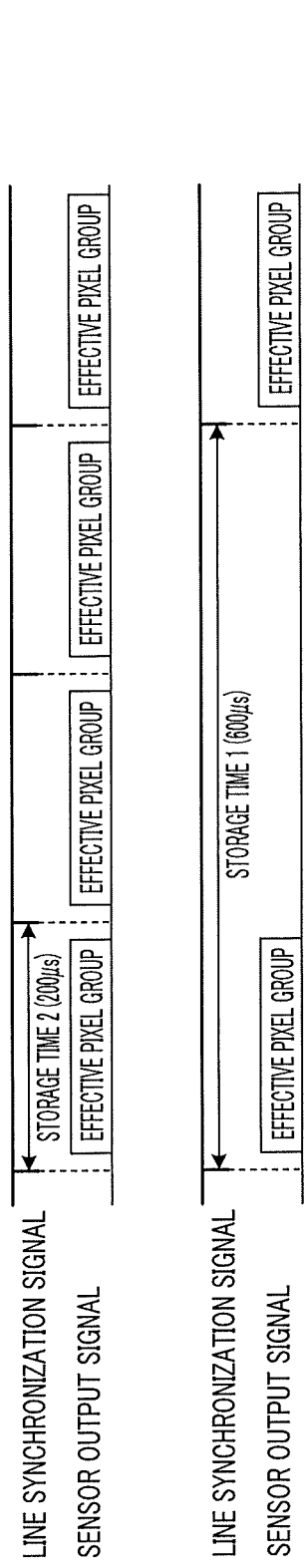
FIGS. 13A to 13C are explanatory charts regarding a prolonged period for generating black correction data caused by expansion of a storage time (line synchronization signal cycle)
Figure 13B:
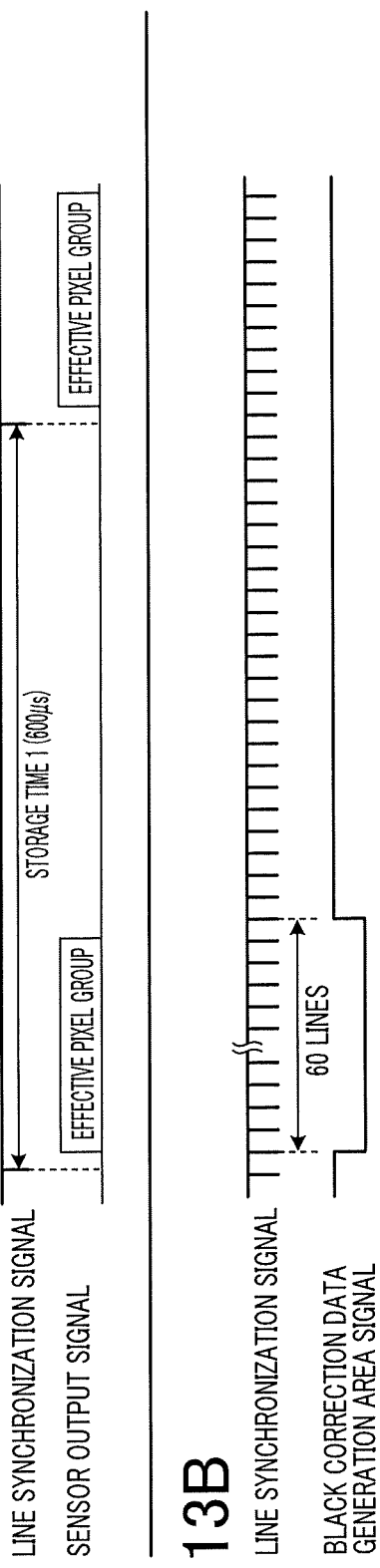
Figure 13C:
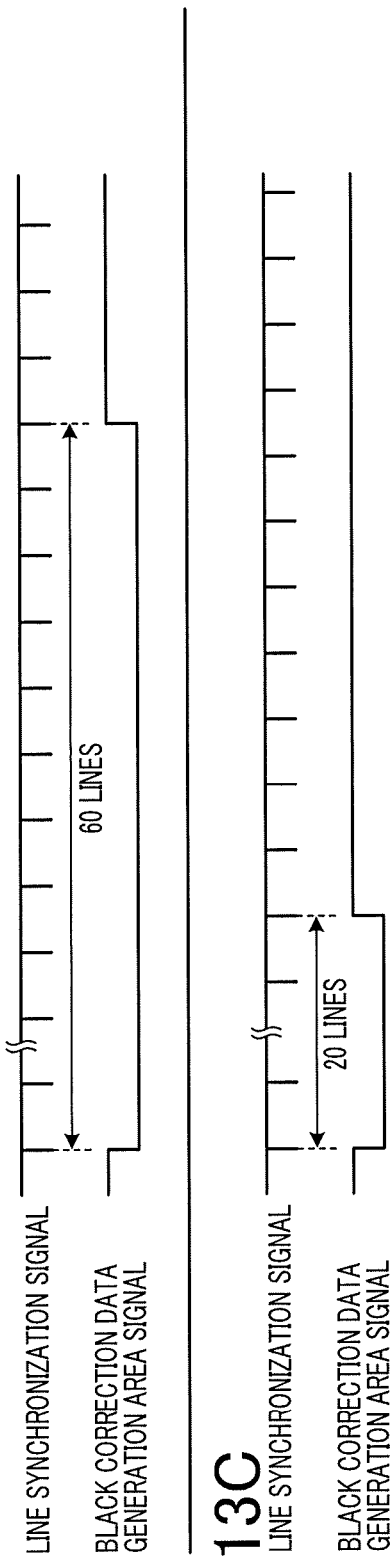

FIGS. 13A to 13C are explanatory charts regarding a prolonged period for generating black correction data caused by expansion of the storage time (line synchronization signal cycle). In generating the black correction data, as described in the first embodiment, for example, the number of acquisition lines of an image signal is set in advance in a register included in a control unit 203, and the control unit 203 asserts a control signal (black correction data generation area signal) corresponding to the set number of lines using a control signal m3.

As illustrated in the setting of recording medium information d1 according to Variation 1 (see FIG. 11), it is assumed that the line synchronization signal cycle is expanded from a storage time 2 (200 μs) to a storage time 1 (600 μs). In this case, as illustrated in FIG. 13A, a period of time until an output signal of an effective pixel group is obtained from a reading device 2 is prolonged. For example, in FIG. 13A, it is indicated that, when the storage time 2 is changed to the storage time 1 three times longer than the storage time 2, time required for the output of the effective pixel group is three times longer. Therefore, when the number of generation lines is fixed and the storage time is changed, the black correction data generation area signal is prolonged.

FIG. 13B illustrates correspondence between the number of generation lines and black correction data generation time. As illustrated in FIG. 13B, for example, when the number of generation lines of the black correction data is fixed to 60 lines, as the storage time 2 changes to the storage time 1, the black correction data generation area signal is prolonged in proportion to the line synchronization signal cycle, that is, the black correction data generation time is prolonged.

Therefore, as the storage time 2 changes to the storage time 1, the number of generation lines is changed to shorten the black correction data generation time.

FIG. 13C illustrates a relationship of the black correction data generation time after the change of the number of generation lines. In this example, the number of generation lines is changed from 60 lines to one-thirds thereof, that is, 20 lines. By changing the number of generation lines in this manner, even when the storage time is extended from the storage time 2 to the storage time 1, the black correction data generation time can be shortened and can be kept constant (equivalent) before and after the change of the storage time in this example. That is, the change in the number of generation lines can be a factor of improving productivity in continuous print jobs.

FIG. 14 is a table illustrating a setting of the recording medium information d1 according to Variation 2. The recording medium information d1 illustrated in FIG. 14 is different from others in that the black correction data generation time (the number of generation lines) is further included therein.

The setting example illustrated in FIG. 14 is based on the setting in FIGS. 13A to 13C, and according to the ratio (3:1) between the storage time 1 and the storage time 2, a generation time 1 and a generation time 2 are set in the ratio (1:3) so that it is set to 20 lines and 60 lines. Note that the generation time does not necessarily correspond to the ratio of the storage time as long as the productivity is lowered. For example, the generation time 1 and the generation time 2 may be set to have a relationship of a ratio (1:2).

Figure 15:
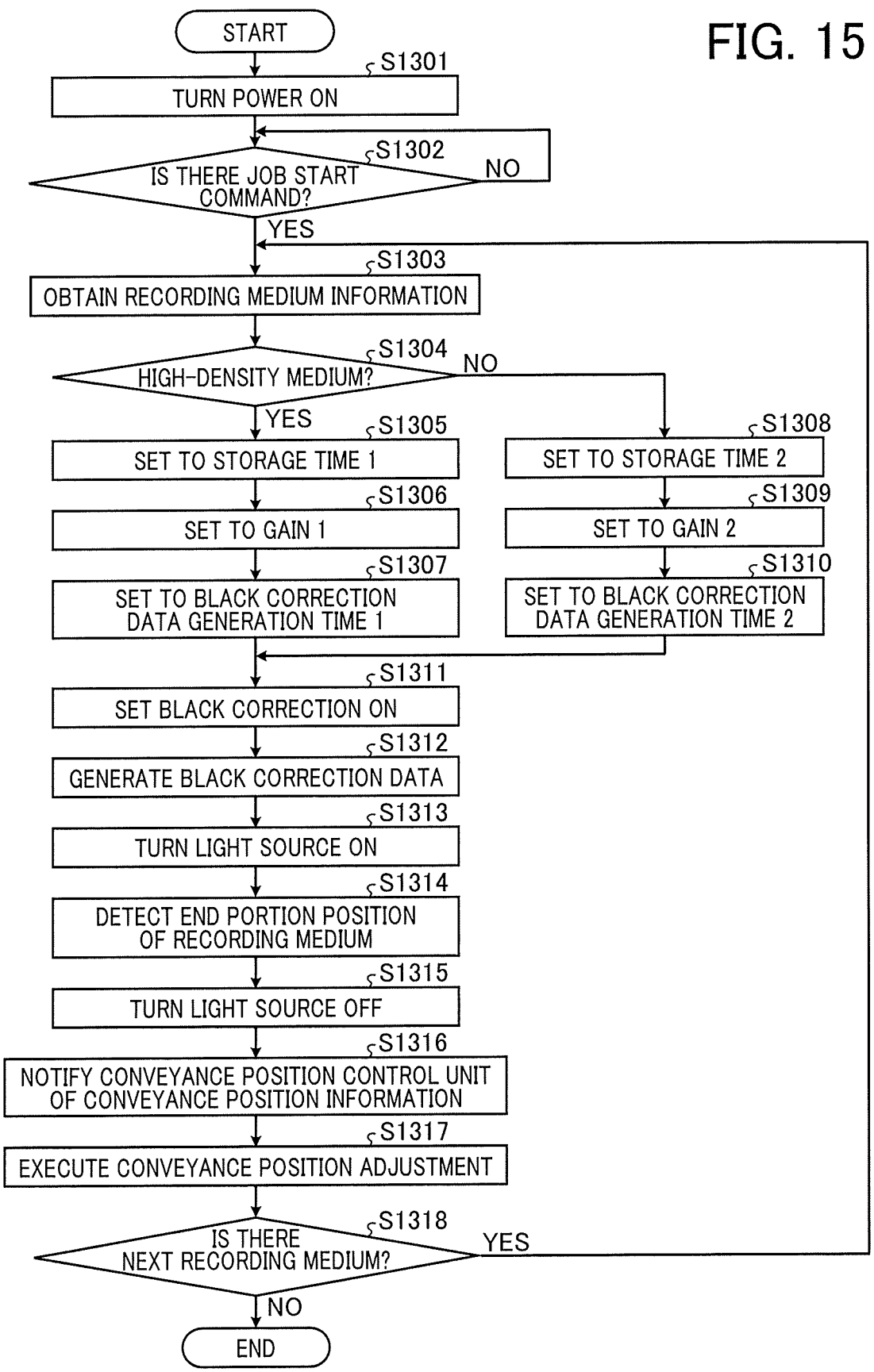
FIG. 15 is a diagram illustrating an exemplary operation flow for position adjustment according to Variation 2.

FIG. 15 is a diagram illustrating an exemplary operation flow for position adjustment according to Variation 2. In the present operation flow, it is different in that, after step S1306 and step S1309 corresponding to step S906 and step S908 in FIG. 12, a step in which the control unit 203 sets the black correction data generation time (step S1307 and step S1310, respectively) is added. In the example illustrated in FIG. 15, the black correction data generation time is set to "generation time 1" for the high-density medium (S1307), and the black correction data generation time is set to "generation time 2" for the low-density medium (S1310).

Other flows correspond to the operation flow of Variation 1 (see FIG. 12). Accordingly, further descriptions will be duplicate and thus omitted.

As described above, in Variation 2, the black correction data generation time (the number of generation lines) can be appropriately switched depending on the type (high density/low density) of the recording medium 1. By this switching, it becomes possible to achieve both productivity during continuous printing and high position detection accuracy.

(Variation 3)

In the descriptions above, an example in which a type of a recording medium 1 is classified into a high density and a low density has been described, but the classification is not limited to the two types of the high density and the low density. There may be three or more types of classifications. In Variation 3, as an example, an exemplary case of being classified into three types (high density, moderate density, and low density) will be described.

FIG. 16 is a table illustrating a setting of recording medium information d1 according to Variation 3. The setting of the recording medium information d1 according to Variation 3 is different from Variation 1 in that the setting of "moderate-density medium" is provided. The moderate-density medium is a recording medium that indicates relatively high spectral reflectance (low density) in a specific wavelength range such as color paper other than black (red, blue, yellow, green, etc.).

In the setting of the moderate-density medium illustrated in FIG. 16, as a difference relative to a low-density medium, only a storage time is set to be the value same as a high-density medium. Note that the respective settings of the high-density medium, the moderate-density medium, and the low-density medium illustrated in FIG. 16 are examples, and each setting may be appropriately set on the basis of a relationship between the specification of a reading device 2 and the density of the recording medium 1 to be read, and the like.

Figure 17B:
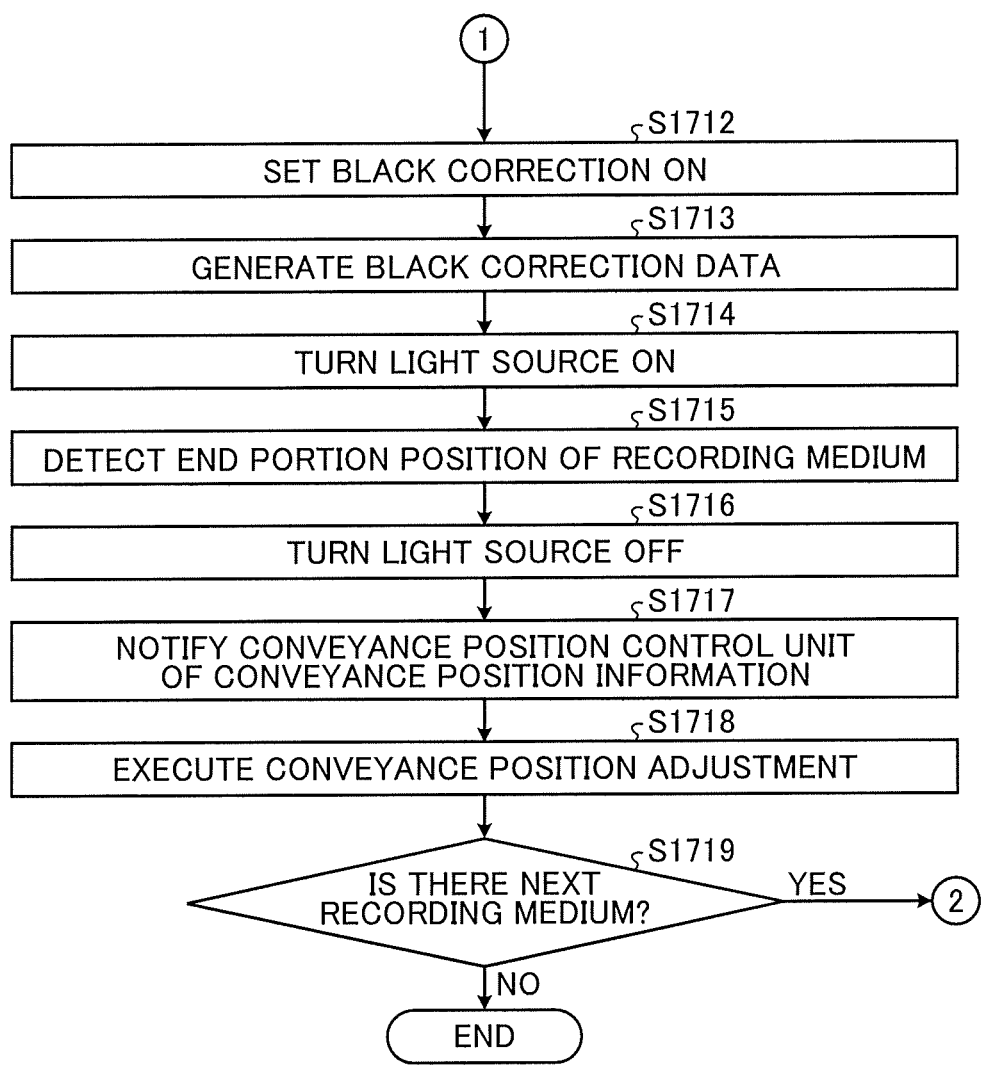

FIG. 17 is a diagram illustrating an exemplary operation flow for position adjustment according to Variation 3. In the present operation flow, it is different in that, after determination of No in step S1704 corresponding to step S904 in FIG. 12, that is, after determination that it is not the high-density medium, determination on whether it is the moderate-density medium (S1705) and setting processing of the moderate-density medium (S1708 and S1709) performed by the control unit 203 are added.

In the present operation flow, when it is determined to be the moderate-density medium in step S1705 (Yes determination), the control unit 203 sets, using a control signal m1, a storage time 1 and a gain 2 on the reading device 2 as a setting of the low-density medium (S1708 and S1709). Note that, when it is determined not to be the moderate-density medium in step S1705 (No determination), that is, when it is determined to be the low-density medium, the control unit 203 performs setting with respect to the low-density medium in step S1710 and step S1711 corresponding to step S907 and step S908 in FIG. 12.

With respect to each of the high-density medium, the moderate-density medium, and the low-density medium, after the storage time and the gain are set, a function of black correction is set to ON in step S1712 corresponding to step S909 in FIG. 12.

Other flows correspond to the operation flow of Variation 1 (see FIG. 12). Accordingly, further descriptions will be duplicate and thus omitted.

In this manner, in Variation 3, the setting can be switched depending on the type (high density/moderate density/low density) of the recording medium 1. By this switching, it becomes possible to perform detailed processing according to the type of the recording medium 1.

Second Embodiment

In the first embodiment, the configuration in which the end position detector 206 receives the image signal D2 and the end position detector 206 detects the pixel number that exceeds a predetermined threshold value as the edge position in the main-scanning direction (X) has been described.

In general, it is known that, in a reading device typified by a contact image sensor (CIS), an output signal amount obtained at the time of reading an object to be read in which spectral reflectance is uniform in a main-scanning direction (X) exhibit characteristics to change in the main-scanning direction (X). Examples of a cause of occurrence of the change in the main-scanning direction (X) (hereinafter referred to as main scanning illuminance distribution) include a shape of a light guide body that causes a light source such as an LED to be made incident to irradiate an object to be read with light across the main-scanning direction (X), an assembly positional relationship between the light guide body and other peripheral components, a positional relationship with the object to be read, and variation in sensitivity characteristic of a sensor itself.

In the second embodiment, a second problem in detection of an edge position of the recording medium 1 is presented, and a specific embodiment for solving the second problem will be described.

Figure 18A:
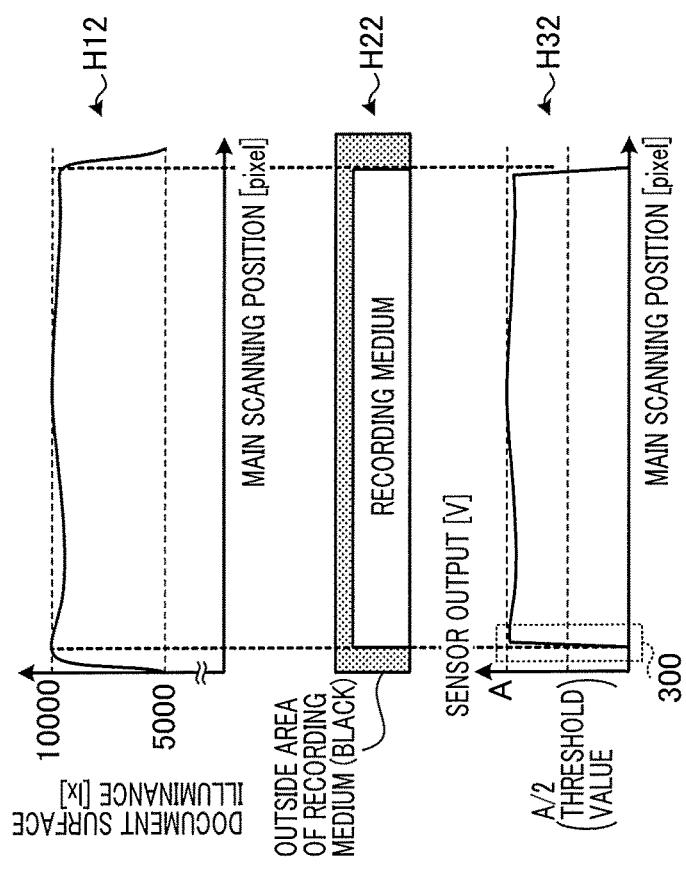
FIGS. 18A to 18C are graphs for illustrating a second problem in detecting the edge position of the recording medium.
Figure 18B:
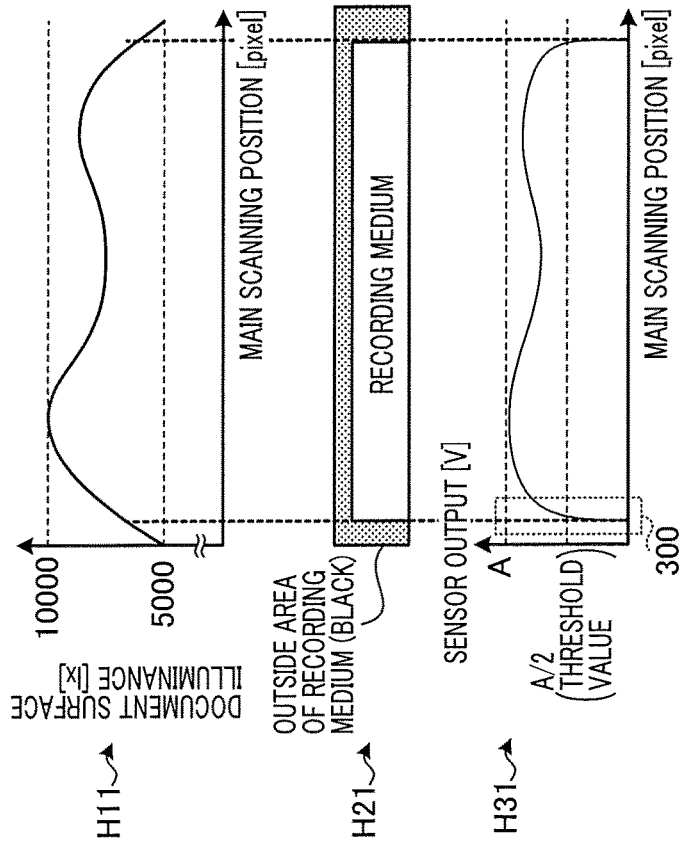

FIGS. 18A and 18B are graphs for illustrating the second problem in detecting the edge position of the recording medium 1. FIGS. 18A and 18B illustrates comparative graphs of sensor output in the vicinity of the edge position with respect to a reading device having a low main scanning illuminance distribution characteristic (case 1) and a reading device having a good main scanning illuminance distribution characteristic (case 2). Note that, in the comparative graphs of the case 1 and the case 2 illustrated in FIGS. 18A and 18B, it is assumed that spectral reflectance of the recording medium 1 is uniform in the main-scanning direction, and a relative positional relationship between the reading device 2 and an edge 1a of the recording medium 1 is the same in the case 1 and the case 2.

FIGS. 18A and 18B illustrate, with respect to the case 1 and case 2, respectively, an illuminance distribution graph in the main-scanning direction (X) (H11 and H12), a conveyance position graph indicating a conveyance position of the recording medium 1 (H21 and H22), and an output distribution graph indicating the output of each pixel from the reading device 2 (H31 and H32), which are in association with each other.

In the case 1, since the main scanning illuminance distribution characteristic is poor, there are variations in document surface illuminance in the main-scanning direction (X) in the illuminance distribution graph H11. Meanwhile, in the case 2, since the main scanning illuminance distribution characteristic is good, the document surface illuminance in the main-scanning direction (X) is stable in the illuminance distribution graph H12.

As illustrated in the output distribution graphs H31 and H32, when macroscopically viewed, the sensor output largely varies in the vicinity of the position of the edge 1a of the recording medium 1 in both of the case 1 and the case 2 similarly. However, when microscopically viewed, there is a clear difference between the two.

Figure 18C:
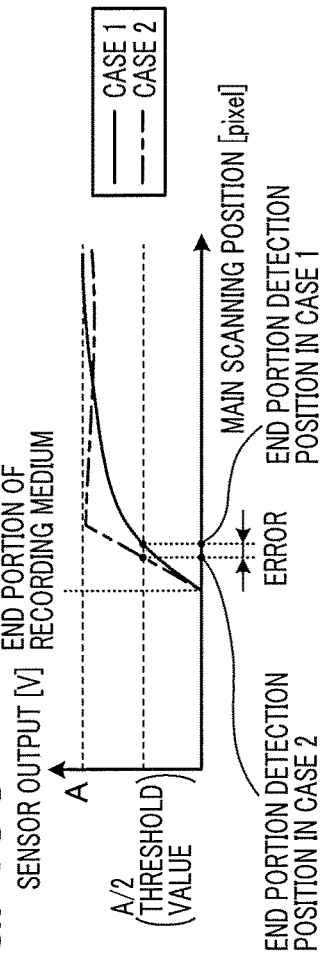

FIG. 18C illustrates an enlarged graph of the sensor output of a frame 300 in the vicinity of the edge position in the case 1 and the case 2. In FIG. 18C, the solid line graph illustrates a sensor output curve in the case 1, and the dot-and-dash line graph illustrates a sensor output curve in the case 2.

As illustrated in the illuminance distribution graph H11 in the case 1, illuminance distribution largely changes in the vicinity of the edge position 1a of the recording medium 1 in the conveyance position graph H21. Accordingly, the sensor output curve in the case 1 illustrated in FIG. 18C has a gentle inclination in the vicinity of the edge position 1a. Meanwhile, in the case 2, as illustrated in the illuminance distribution graph H12, change in illuminance distribution is minute and is stable in the vicinity of the edge position 1a of the recording medium 1 in the conveyance position graph H21. Accordingly, the sensor output curve in the case 2 illustrated in FIG. 18C has an inclination steeper than that in the case 1 in the vicinity of the edge position 1a.

It is apparent from the difference of the output curve in the vicinity of the edge position illustrated in FIG. 18C that the main scanning position exceeding a predetermined threshold value (A/2) in the main-scanning direction (X) differs strictly speaking. Accordingly, there is a problem that, as illustrated in the comparison between the case 1 and the case 2, the position detection result relative to the real edge position 1a of the recording medium 1 differs depending on the reading device. Such a problem has a large influence on a low-density medium having a relatively high signal output of the reading device 2.

Figure 19:
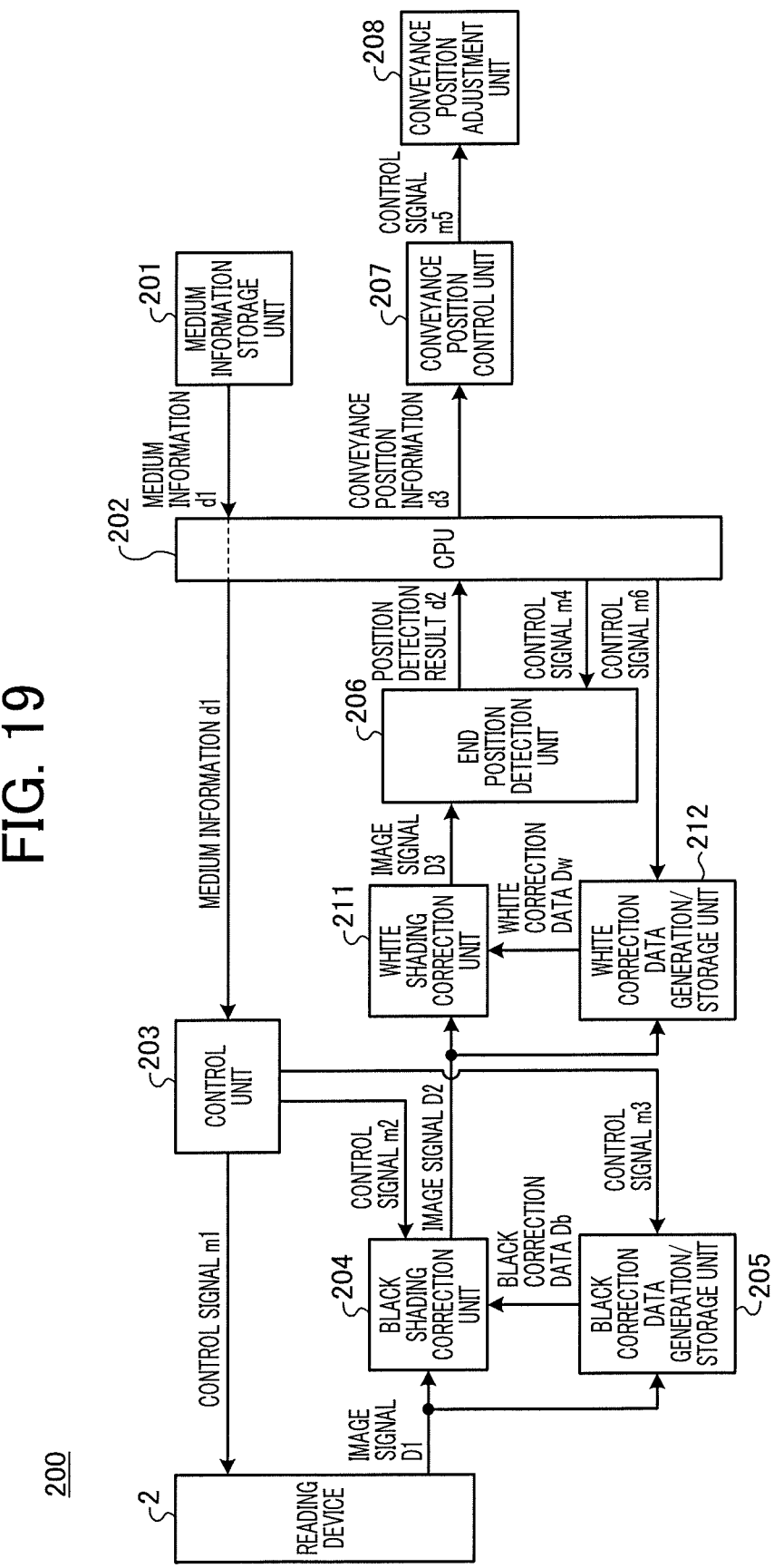
FIG. 19 is a diagram illustrating an exemplary configuration of a position detecting device according to a second embodiment.

FIG. 19 is a diagram illustrating an exemplary configuration of a position detecting device 200 according to the second embodiment. Hereinafter, parts common to the first embodiment will be denoted by the same reference signs or the like to omit descriptions thereof, and parts different from the first embodiment will be described.

The position detecting device 200 according to the second embodiment further includes a white shading correction unit 211, and a white correction data generation/storage unit 212. The white shading correction unit 211 and the white correction data generation/storage unit 212 correspond to a "white correction processor".

The white correction data generation/storage unit 212 obtains, with an optional timing input by a control signal m6 from a CPU 202 as a starting point, the image signal D2 of a predetermined number of lines, and generates white correction data Dw on the basis of the obtained image signal D2. Further, the white correction data generation/storage unit 212 includes a RAM, and stores and holds the generated white correction data in the RAM.

For example, the white correction data generation/storage unit 212 irradiates a reference density member (member having uniform density across the main scanning area) positioned to face the reading device 2 with light to obtain an image signal of a predetermined number of lines, and calculates an average value or a mode value of the predetermined number of lines for each pixel, and the like to remove a random noise component, thereby generating the white correction data Dw. Note that this method is an example, and the method of generating the white correction data Dw is not limited thereto.

The white shading correction unit 211 executes white shading correction processing (corresponding to "white correction processing"). For example, the white shading correction unit 211 reads the white correction data Dw held in the white correction data generation/storage unit 212 in advance, executes calculation expressed by the following formula (2) on the image signal D2 output from the black shading correction unit 204, and outputs an image signal D3 having been subject to the white shading correction to the end position detector 206 in the subsequent stage.

$$D3(n)=D2(n)/Dw(n)\times\alpha(n \text{ is a pixel number)} \quad (2)$$

Here, α is a correction coefficient, which is not particularly limited as long as it can be expressed as a digital value according to a hardware configuration such as 255 (8 bits) and 1023 (10 bits).

Note that, although the white correction data Dw is calculated for each pixel with respect to the image signal D2 in the white shading correction calculation expressed by the formula (2), the method of calculating the white shading correction is not limited to the method of calculation for each pixel. For example, the white correction data Dw may be generated and held for each of a plurality of pixels, and the white shading correction calculation may be performed for each of the plurality of pixels.

Figure 20B:
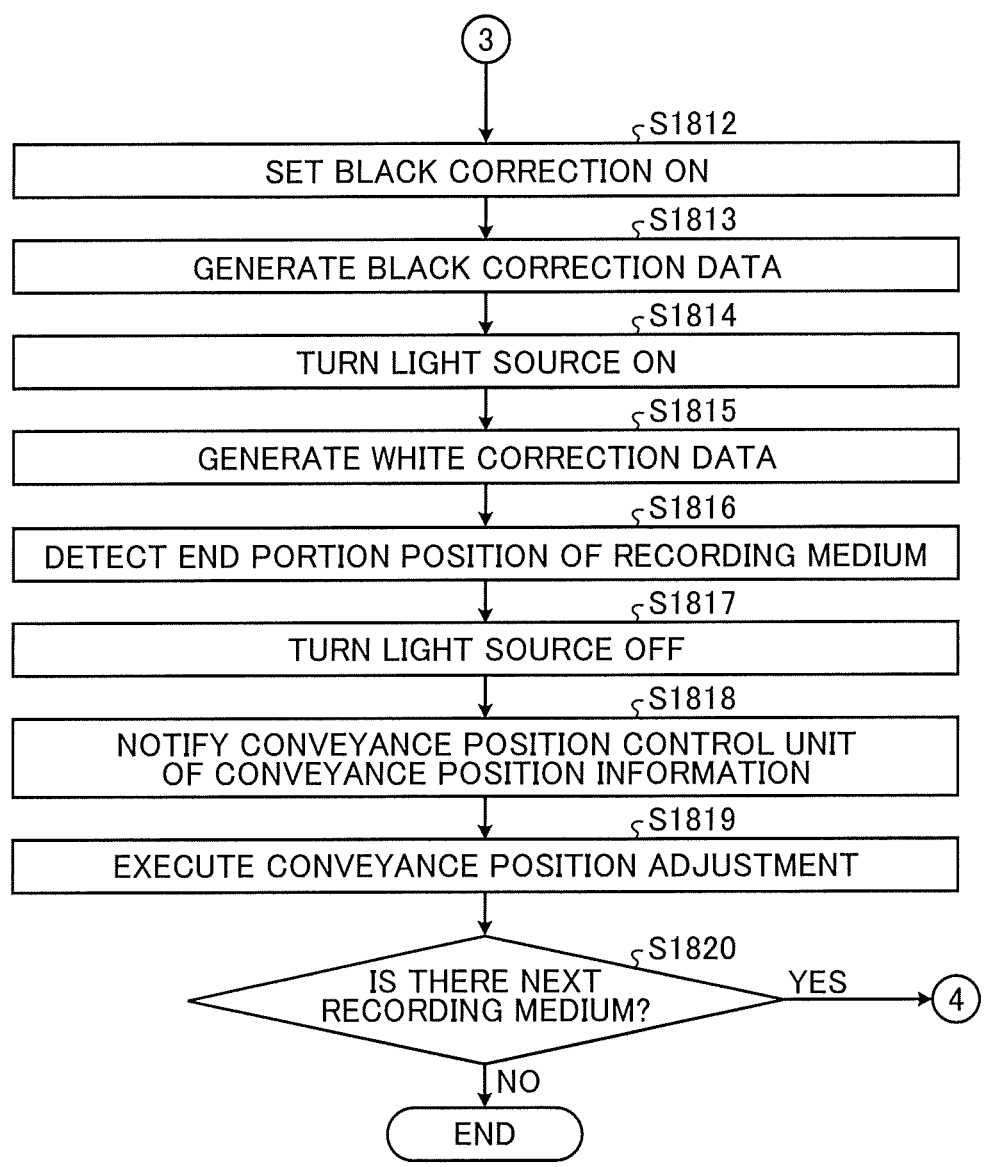

FIG. 20 is a diagram illustrating an exemplary operation flow for position adjustment according to the second embodiment. In the present operation flow, it is different in that, in the operation flow according to Variation 3 of the first embodiment (see FIG. 17), immediately after step S1814 for turning on the light source (corresponding to step S1714 in FIG. 17), processing in which the control signal m6 is output from the CPU 202 and the white correction data generation/storage unit 212 generates and holds the white correction data is added.

In the present operation flow, after the light source is turned on (S1814), the control signal m6 is output from the CPU 202, and the white correction data generation/storage unit 212 generates and holds the white correction data (S1815). Subsequently, a control signal m4 is output from the CPU 202, and the end position detector 206 detects the edge position with respect to the image signal D3 output from the white shading correction unit 211 (S1816).

Other flows correspond to the operation flow of Variation 3 (see FIG. 17). Accordingly, further descriptions will be duplicate and thus omitted.

In order to solve the problem described above, it is technically possible to adjust the amount of light for each main scanning position across the entire main-scanning direction (X) to uniformize the document surface illuminance. However, it may result in an enormous increase in cost, and is not necessarily a practical means. That is, the main scanning illuminance distribution different from each reading device cannot be corrected by light amount adjustment or gain adjustment. In this manner, in the second embodiment, the main scanning illuminance distribution (illumination unevenness) that each individual reading device 2 has is removed by performing the white shading correction. Therefore, in addition to variation in sensor sensitivity, the problem of the main scanning illuminance distribution (illumination unevenness) can also be solved, whereby further improvement in position detection accuracy of the recording medium can be expected.

(Variation 1 of Second Embodiment)

As Variation 1 of the second embodiment, a configuration for switching a setting of a correction coefficient α according to a type (density) of a recording medium 1 will be described. Here, as the configuration for switching the setting of the correction coefficient α, an exemplary setting of recording medium information d1 and an operation flow at that time are illustrated. In addition, effects of a case where the switching of the correction coefficient α is enabled will be described.

FIG. 21 is a table illustrating a setting of the recording medium information d1 according to Variation 1 of the second embodiment. The setting of the recording medium information d1 according to Variation 1 of the second embodiment is different from Variation 3 of the first embodiment in that the setting of the "correction coefficient α" is provided. In this example, the setting of the correction coefficient α is changed according to the density of the recording medium 1.

FIG. 22 is an explanatory graph of an effect exerted by a setting change of the correction coefficient α. Here, for example, a relationship between the correction coefficient α and a threshold value in a digital signal amount of 8-bit gradation (0 to 255 digits) is illustrated.

Depending on the specification (light receiving sensitivity characteristics of an image sensor, light amount of a light source, etc.) of the reading device 2, there are some cases in which the sufficient signal output exceeding the threshold value at the edge position of the recording medium cannot be obtained only by adjustment of a storage time (line synchronization signal cycle) and adjustment of gain amplifier amplification factor.

For example, as illustrated in FIG. 22, when a setting value of the correction coefficient α at the time of the white shading correction is set to "255", the signal output (digital output) of the area of the recording medium 1 is 70 digits, which does not reach the threshold value 128 digits. In this case, the edge position of the recording medium 1 cannot be detected.

Meanwhile, the setting of the correction coefficient α is changed to "511 (about twice as high as 255)". In this case, the signal output (digital output) of the area of the recording medium 1 can secure 140 digits that is twice as high as 70 digits, and as a result, the edge position of the recording medium 1 can be detected.

In this manner, by appropriately switching the setting value of the correction coefficient α according to the type (density) of the recording medium 1, the effects can be exerted particularly in the case where a high-density medium is selected.

Figure 23A:
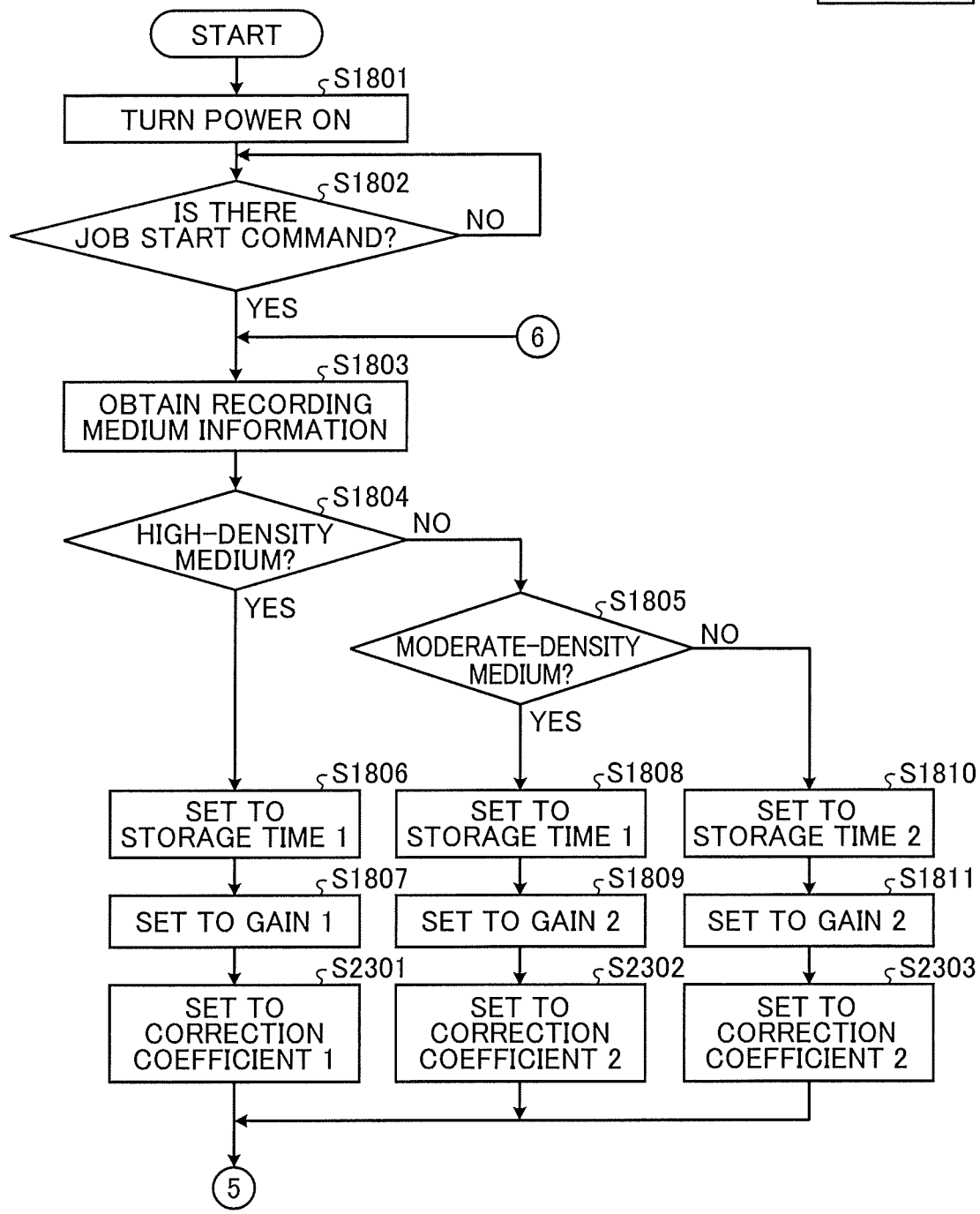
FIGS. 23A and 23B (FIG. 23) are a diagram illustrating an exemplary operation flow for position adjustment according to Variation 1 of the second embodiment.
Figure 23B:
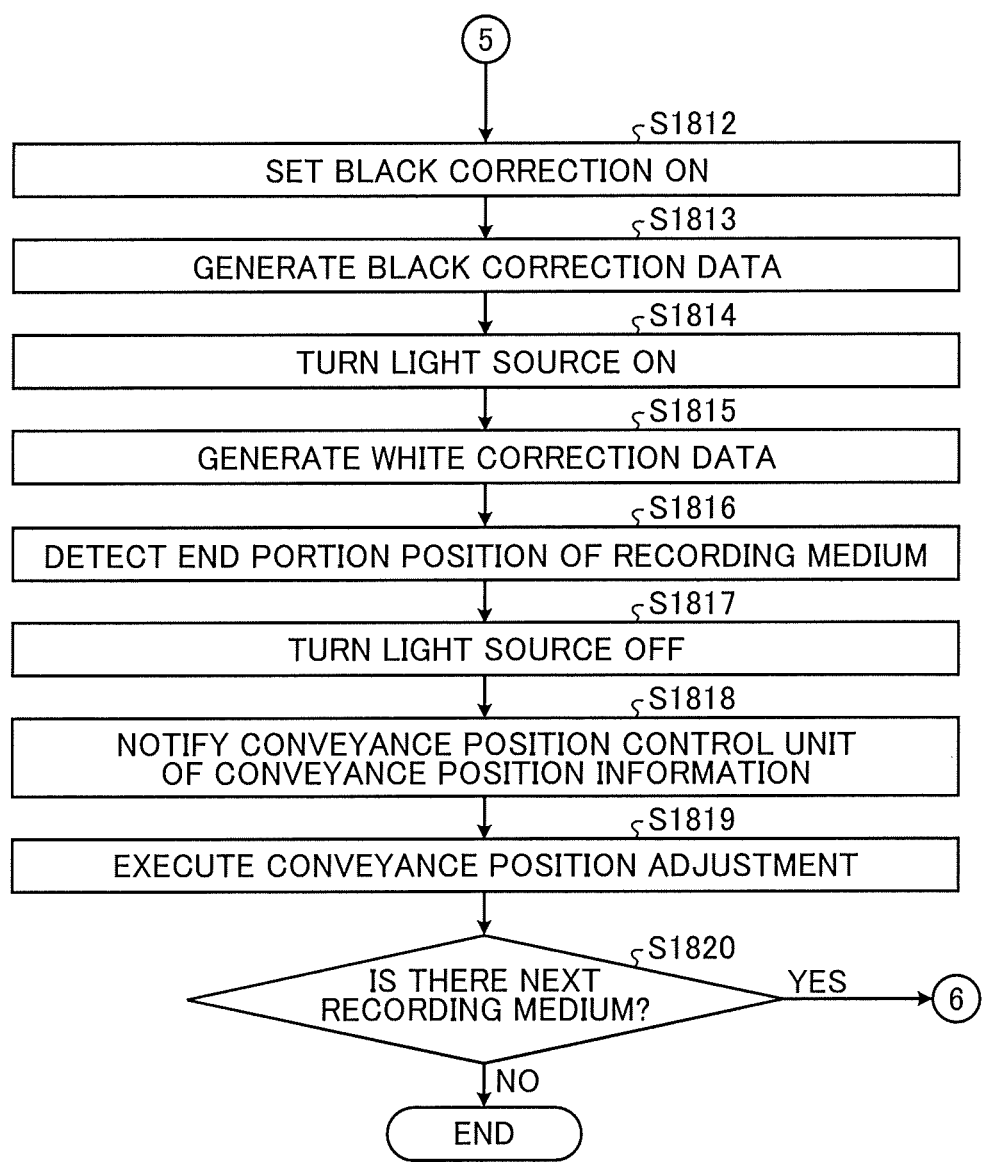

FIG. 23 is a diagram illustrating an exemplary operation flow for position adjustment according to Variation 1 of the second embodiment. In the present operation flow, it is different in that, in the operation flow according to the second embodiment (see FIG. 20), processing for setting the correction coefficient α is added immediately after respective steps S1807, S1809, and S1811 (steps S2301, S2302, and S2303, respectively). By this processing, an appropriate correction coefficient α is set in the white shading correction unit 211 according to the density of the recording medium 1.

Other flows correspond to the operation flow of the second embodiment (see FIG. 20). Accordingly, further descriptions will be duplicate and thus omitted.

In this manner, in Variation 1 of the second embodiment, the setting value of the correction coefficient α used at the time of calculation of the white shading correction is switched according to the type of the recording medium. Accordingly, it becomes possible to expand an amplification/attenuation (adjustment) range of the image signal output, and the corresponding density range of the recording medium 1 expands.

(Variation 2 of Second Embodiment)

As Variation 2 of the second embodiment, a configuration including a non-volatile memory capable of storing information (data) even when power supply to a system is interrupted (OFF) will be described.

Figure 24:
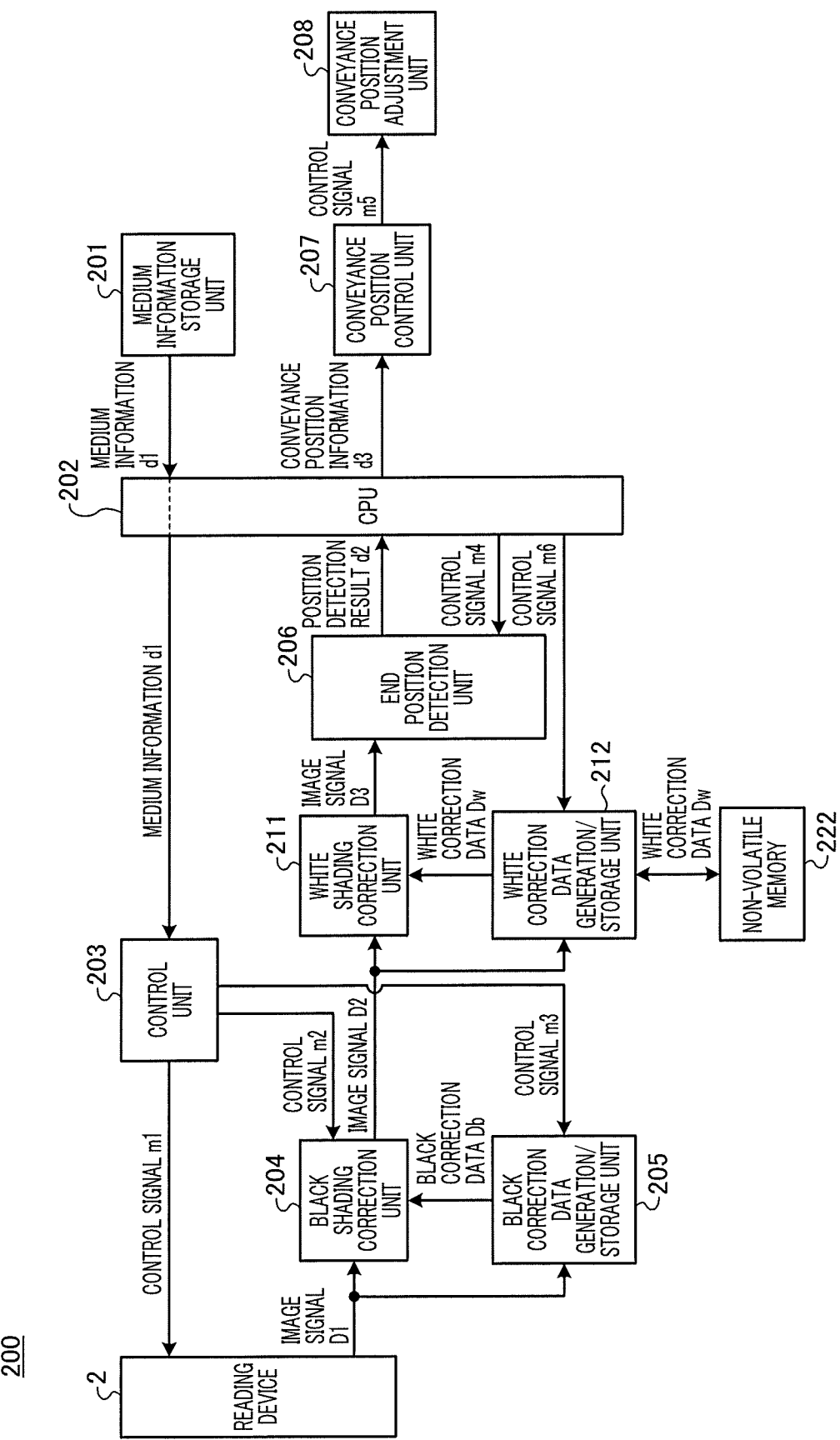
FIG. 24 is a diagram illustrating an exemplary configuration of a position detecting device according to Variation 2 of the second embodiment.

FIG. 24 is a diagram illustrating an exemplary configuration of a position detecting device 200 according to Variation 2 of the second embodiment. Hereinafter, parts common to Variation 1 of the second embodiment will be denoted by the same reference signs or the like to omit descriptions thereof, and parts different from Variation 1 of the second embodiment will be described.

The position detecting device 200 according to Variation 2 of the second embodiment further includes a non-volatile memory 222. Examples of the non-volatile memory 222 include an inexpensive information storage medium having large capacity such as a serial flash ROM.

By providing the non-volatile memory 222, a white correction data generation/storage unit 212 can write white correction data Dw, which is generated on the basis of an image signal D2 and is stored in an internal RAM, to the non-volatile memory 222 upon receipt of an execution command by a control signal m6 from the CPU 202.

Further, it is also possible that the white correction data generation/storage unit 212 receives the execution command by the control signal m6 from the CPU 202, reads the white correction data Dw stored in the non-volatile memory 222, and stores (writes) it in the internal RAM.

Figure 25A:
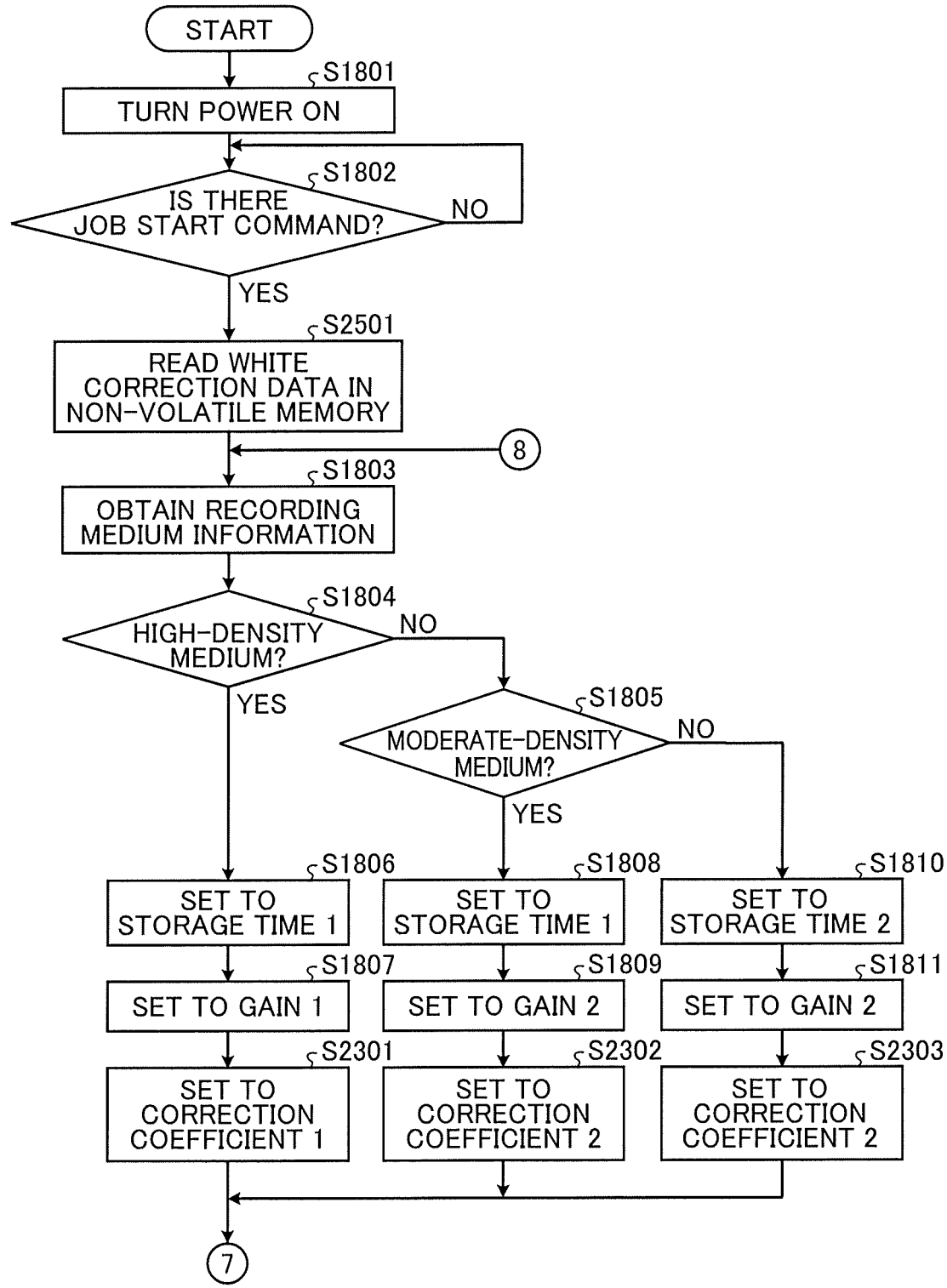
FIGS. 25A and 25B (FIG. 25) are a diagram illustrating an exemplary operation flow for position adjustment according to Variation 2 of the second embodiment.
Figure 25B:
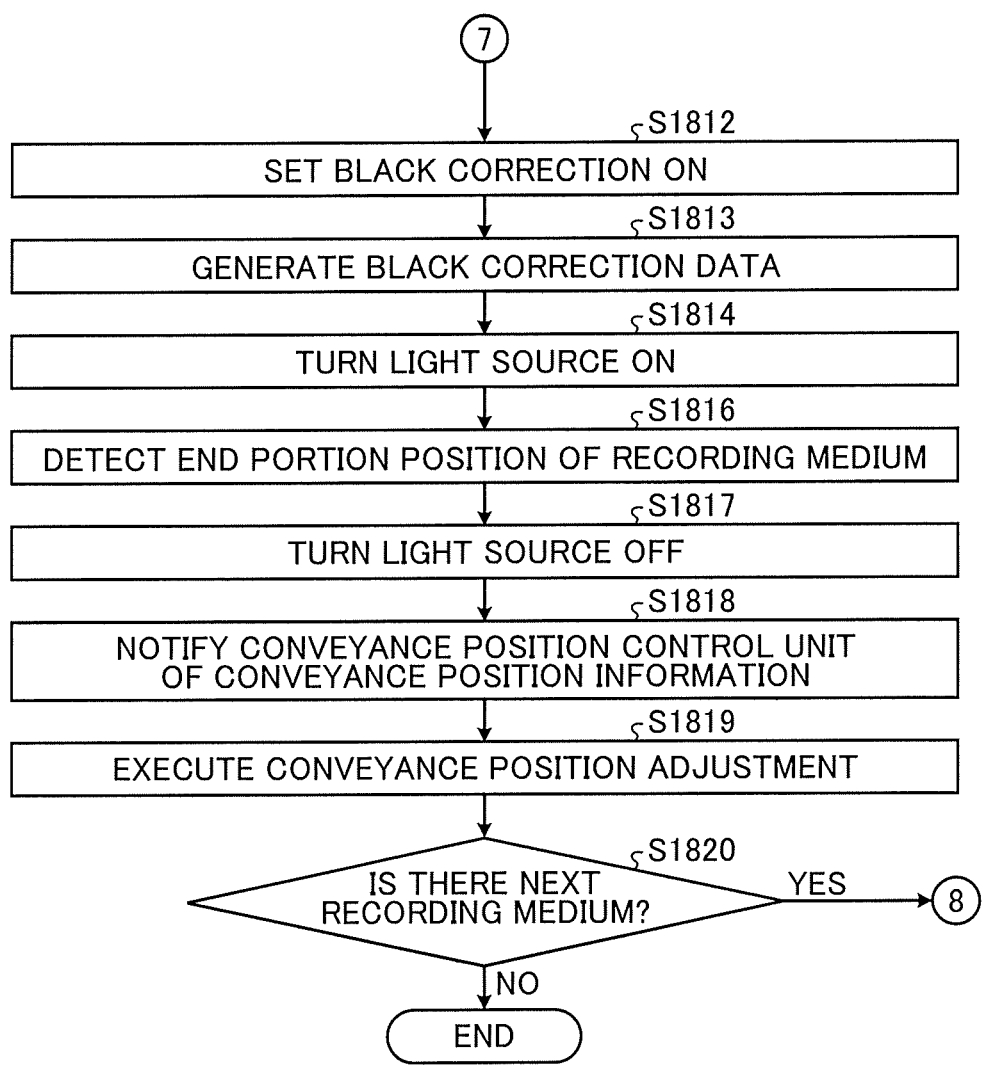

FIG. 25 is a diagram illustrating an exemplary operation flow for position adjustment according to Variation 2 of the second embodiment. In the present operation flow, it is different in that, in the operation flow according to Variation 1 of the second embodiment (see FIG. 23), processing for reading the white correction data from the non-volatile memory 222 (S2501) is added, and processing for generating the white correction data (S1815) is deleted. The position detecting device 200 according to Variation 2 of the second embodiment includes the non-volatile memory 222 capable of holding the white correction data even after the power supply is interrupted. Therefore, the position detecting device 200 can read and use the white correction data generated in advance from the non-volatile memory 222, and processing for generating the white correction data during normal print operation can be omitted.

Other flows correspond to the operation flow of Variation 1 of the second embodiment (see FIG. 23). Accordingly, further descriptions will be duplicate and thus omitted.

In Variation 2 of the second embodiment, since the non-volatile memory that holds the white correction data even after the power supply is interrupted is included, for example, it is also possible to store and hold the white correction data, which has been generated by reading a reference density member at the time of factory shipment of a product, in the non-volatile memory. In this case, during the normal print operation, white shading correction can be performed using the white correction data stored in the non-volatile memory. Therefore, it is not required to constantly set the reference density member at a position facing a reading device 2, whereby effects of reducing costs of the whole device and saving space can be obtained. Furthermore, during the normal print operation, time required for generating the white correction data can be omitted, whereby productivity during continuous printing and high position detection accuracy can be simultaneously achieved.

(Variation 3 of Second Embodiment)

Depending on mechanism of surroundings of a reading device 2, at a main scanning position outside the area of a recording medium 1, unnecessary reflected light (e.g., stray light component generated in such a manner that light rays emitted from a light source in a device are irregularly reflected between peripheral mechanism parts) may enter an image sensor in some cases. In Variation 3 of the second embodiment, a variation in the case where the unnecessary component is considered will be described.

Figure 26:
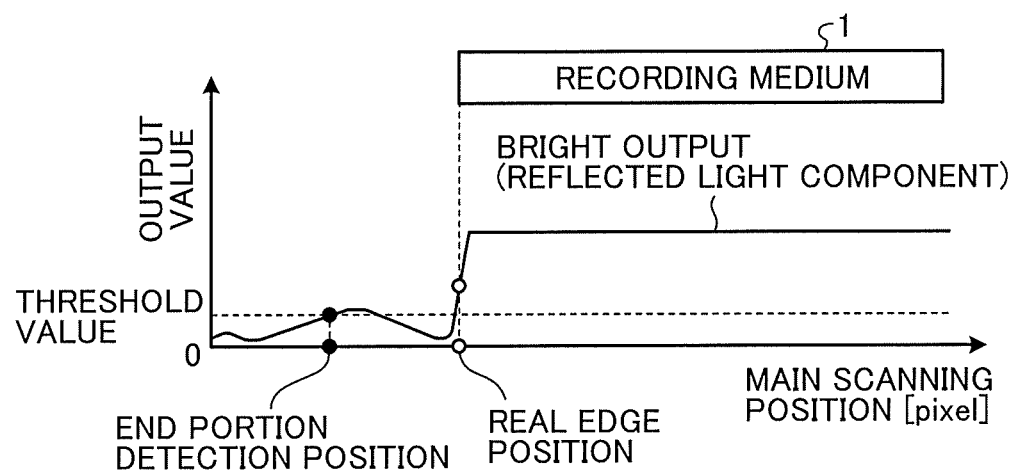
FIG. 26 is a graph illustrating a case where erroneous detection due to unnecessary components outside the area of the recording medium occurs.

FIG. 26 is a graph illustrating a case where erroneous detection due to unnecessary components outside the area of the recording medium 1 occurs.

With respect to the entrance of the unnecessary component into the image sensor, there is a case where, for example, in the device, light rays emitted from the light source are irregularly reflected between the peripheral mechanism parts and the stray light component is made incident. Further, since it is practically difficult to set reflectance of a black light shielding/light absorbing member at a position facing the reading device 2 to 0%, there is a case where reflected light slightly enters the image sensor due to the imperfection.

Therefore, particularly when the recording medium 1 has a high density, depending on the relationship between a signal output component based on the reflected light from the recording medium 1 and a threshold value, as illustrated in FIG. 26, there is a possibility that a position exceeding the threshold value outside the area of the recording medium 1 is erroneously detected as an edge position, and the existence of the unnecessary component cannot be ignored.

Figure 27A:
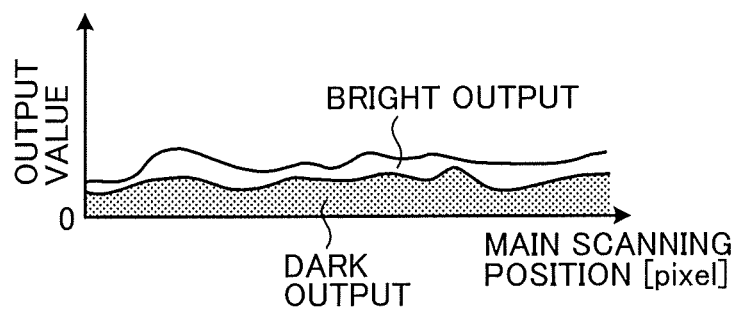
FIGS. 27A to 27C are explanatory graphs illustrating a mechanism for removing the influence of the unnecessary components outside the area of the recording medium.
Figure 27B:
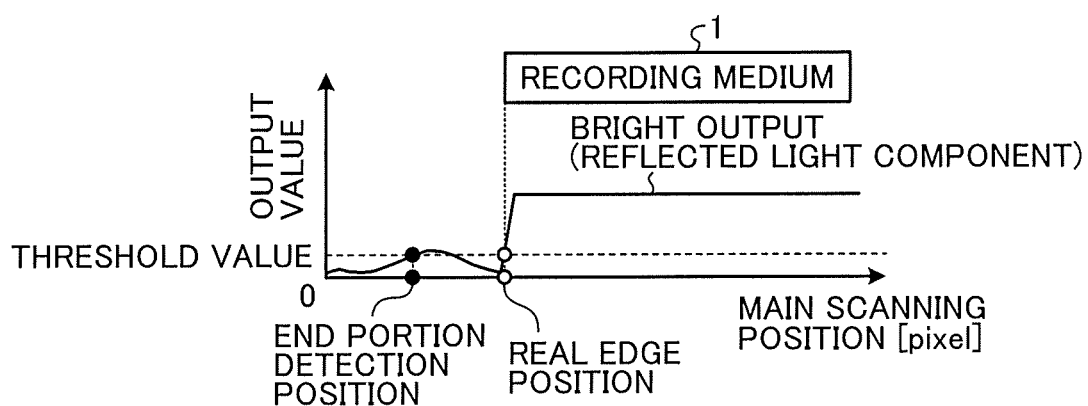
Figure 27C:
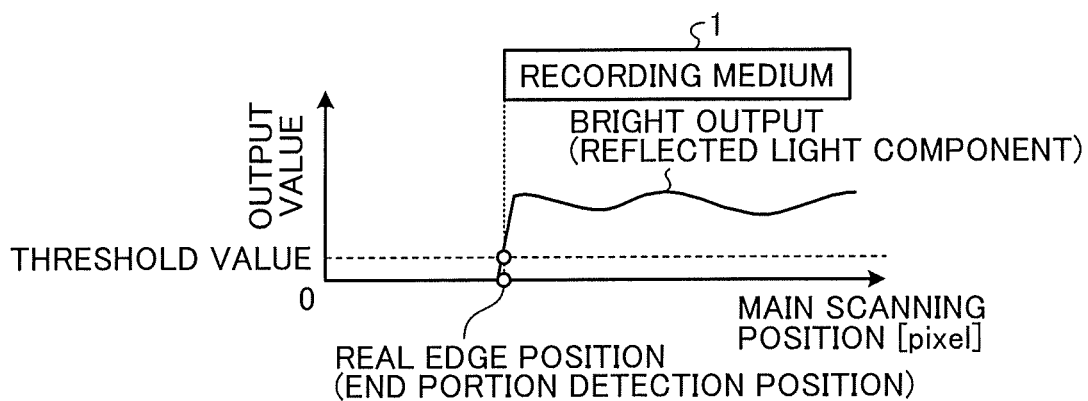

FIGS. 27A to 27C are explanatory graphs illustrating a mechanism for removing the influence of the unnecessary components outside the area of the recording medium 1. FIG. 27A illustrates an example of component distribution of the signal output obtained from each image sensor when a light source 304 is turned on without the recording medium 1. As illustrated in FIG. 27A, a bright output based on the unnecessary reflected light component is added to a dark output. This bright output component is slightly different depending on the peripheral mechanical configuration or peripheral members and a main scanning position, which is not necessarily uniform in a main-scanning direction.

Accordingly, when black correction data is generated from the dark output obtained in the non-lighting state of the light source 304 and the dark output is removed using the black correction data, unnecessary components remain.

FIG. 27B illustrates the state of the output value at each main scanning position in the state where the unnecessary components remain after the black correction. As illustrated in FIG. 27B, the unnecessary components remain without being removed outside the area of the recording medium 1, and are distributed as bright outputs. In this case, depending on the setting of the threshold value, since the output value of the bright output exceeds the threshold value at a position outside the area of the recording medium 1, there is a possibility that the position other than the real edge position is erroneously detected as an edge position.

In order to solve this problem, the black correction data is generated from the signal output in the state where the light source 304 is turned on and the bright output of the unnecessary component is superimposed on the dark output. FIG. 27C illustrates the state of the output value at each main scanning position after performing the black correction using the black correction data generated in the lighting state. When the black correction is performed using the black correction data generated in the lighting state, both of the dark output and the bright output of the reflected light component are removed outside the area of the recording medium 1, and the output value at each main scanning position outside the area of the recording medium 1 indicates zero or a value close thereto.

In FIG. 27C, although uniformity of the signal output within the area of the recording medium 1 is slightly impaired due to the influence of the unnecessary bright output component, the signal output outside the area of the recording medium 1 is completely removed. Therefore, the output value exceeds the threshold value at the real edge position, not outside the area of the recording medium 1, and the edge position can be obtained with high detection accuracy.

Figure 28B:
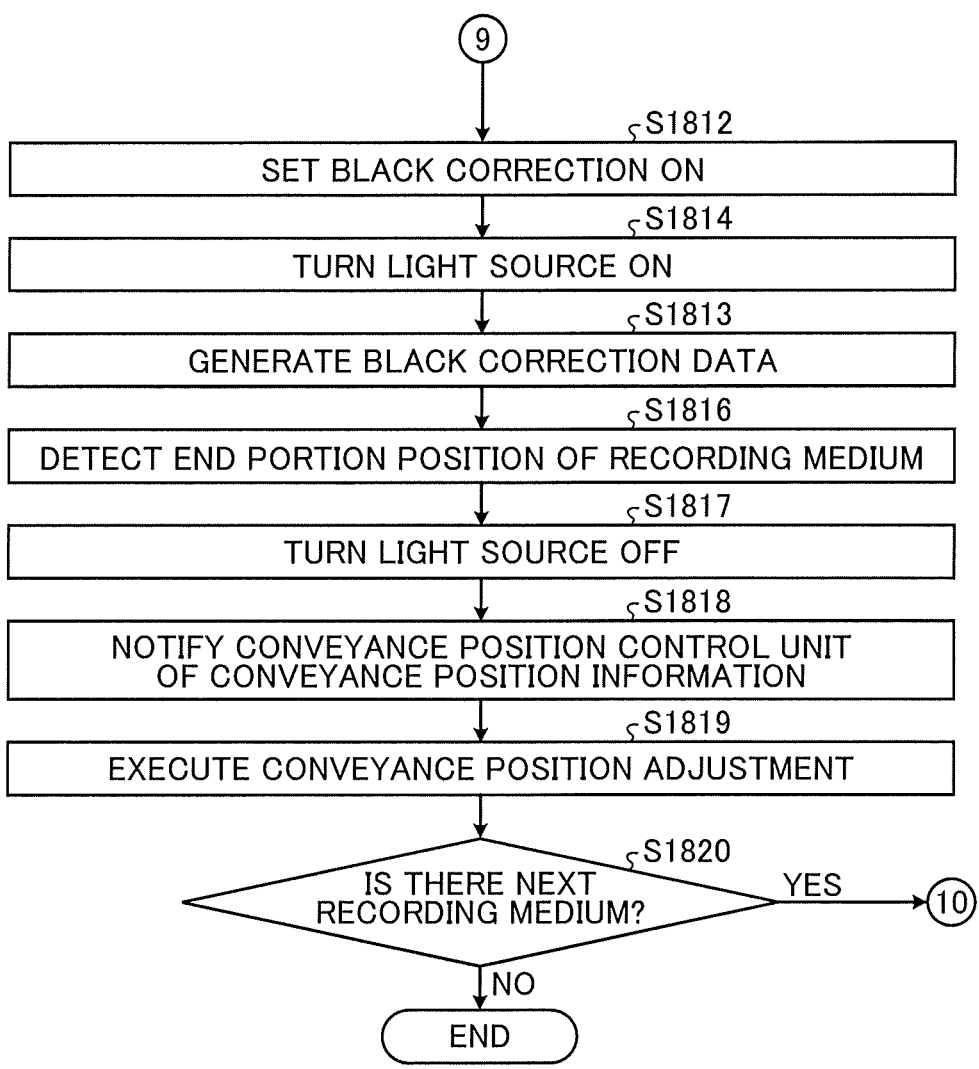

FIG. 28 is a diagram illustrating an exemplary operation flow for position adjustment according to Variation 3 of the second embodiment. In the present operation flow it is different in that, in the operation flow according to Variation 2 of the second embodiment (see FIG. 25), the order of generation of the black correction data (step S1813) and lighting of the light source 304 (step S1814) is switched. By switching the order of those, the black correction data is generated in the lighting state of the light source 304. Other flows correspond to the operation flow of Variation 2 of the second embodiment (see FIG. 25). Accordingly, further descriptions will be duplicate and thus omitted.

In Variation 3 of the second embodiment, the black correction data is generated and held in such a manner that unnecessary light components outside the area of the recording medium 1, which is caused by the influence of the peripheral mechanical configuration of the reading device 2, is included. Accordingly, position detection accuracy with respect to a high-density medium is particularly improved, and the density range corresponding to the recording medium can be expanded.

(Variation 4 of Second Embodiment)

Variation 4 of the second embodiment is characterized in that, in a case where a medium is a recording medium having high directivity of reflected light, a control unit 203 operates in a first mode. In most cases, a general-purpose reading device receives diffusion reflected light from a subject, and outputs a signal. Therefore, by applying the first mode in a case where glossy paper, metallic paper, and the like in which the reflected light cannot be received and sufficient signal output cannot be expected since directivity of the reflected light is high (regular reflection component amount is large) although reflectance is high are used, highly accurate and highly reliable position detection can be implemented.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A position detecting device, comprising:
an image sensor configured to read reflected light of light emitted from a light source onto a medium; and
circuitry configured to:
perform black correction processing on an output signal of the image sensor using black correction data of the image sensor; and
detect a position of the medium from the output signal after the black correction processing.

2. The position detecting device according to claim 1, further comprising:
a memory configured to store medium information of the medium,
wherein the circuitry is further configured to set an operation condition according to a type of the medium based on the medium information.

3. The position detecting device according to claim 2, wherein the operation condition includes performing the black correction processing, and
the circuitry is further configured to detect the position of the medium from the output signal after the black correction processing in an operation mode.

4. The position detecting device according to claim 3, wherein the circuitry is further configured to perform the black correction processing in the operation mode in a case that the medium is set as a high-density medium in the medium information.

5. The position detecting device according to claim 3, wherein the circuitry is further configured to detect the position of the medium from the output signal in another operation mode that does not perform the black correction processing.

6. The position detecting device according to claim 3, wherein the circuitry is further configured to:
set, as the operation condition, a number of acquisition lines of the output signal of the image sensor according to the type of the medium; and
generate the black correction data from the output signal of the image sensor based on the number of acquisition lines.

7. The position detecting device according to claim 3, wherein the circuitry is further configured to operate in the operation mode in a case that the medium is black paper or transparent paper.

8. The position detecting device according to claim 3, wherein the circuitry is further configured to perform the black correction processing in the operation mode in a case that the medium is a recording medium having high directivity of the reflected light.

9. The position detecting device according to claim 2, wherein the circuitry is further configured to adjust a light receiving amount of the image sensor per unit time according to a setting of the operation condition.

10. The position detecting device according to claim 2, wherein the circuitry is further configured to amplify or attenuate an output signal amount of the image sensor according to a setting of the operation condition.

11. The position detecting device according to claim 10, wherein the circuitry is further configured to adjust a light receiving amount of the image sensor per unit time according to the setting of the operation condition, and
preferentially apply adjustment of the light receiving amount rather than amplification or attenuation of the output signal amount.

12. The position detecting device according to claim 2, wherein the type of the medium includes a high-density medium, a moderate-density medium, and a low-density medium.

13. The position detecting device according to claim 1, wherein the circuitry is further configured to perform white correction processing on the output signal of the image sensor using white correction data obtained when a reference density member is read by the image sensor.

14. The position detecting device according to claim 13, wherein the circuitry is further configured to set, as an operation condition, a correction coefficient of the white correction processing according to a type of the medium.

15. The position detecting device according to claim 13, further comprising:
a non-volatile memory configured to store the white correction data,
wherein the circuitry is further configured to perform the white correction processing on the output signal of the image sensor using the white correction data stored in the non-volatile memory.

16. The position detecting device according to claim 1, wherein the circuitry is further configured to generate the black correction data from the output signal of the image sensor in a state in which the light source is turned on before the medium is read.

17. The position detecting device according to claim 1, wherein the circuitry is further configured to correct positional deviation in a main-scanning direction of the medium on a basis of a result of the detection of the position of the medium.

18. An image forming apparatus, comprising:
the position detecting device according to claim 17; and
an image forming device configured to form an image on the medium of which the positional deviation has been corrected.

19. The position detecting device according to claim 1, wherein the circuitry is further configured to:
detect a position of an edge of the medium from the output signal after the black correction processing.

20. A position detecting method, comprising:
reading reflected light of light emitted from a light source onto a medium using an image sensor;
performing black correction processing on an output signal of the image sensor using black correction data of the image sensor; and
detecting a position of the medium from the output signal after the black correction processing.

\* \* \* \* \*